(12) United States Patent
Conrad

(10) Patent No.: US 6,279,318 B1
(45) Date of Patent: *Aug. 28, 2001

(54) HEAT EXCHANGER FOR A HEAT ENGINE

(75) Inventor: Wayne Ernest Conrad, Hampton (CA)

(73) Assignee: Fantom Technologies Inc., Welland (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,138

(22) Filed: Mar. 10, 2000

Related U.S. Application Data
(60) Provisional application No. 60/182,050, filed on Feb. 11, 2000, provisional application No. 60/182,105, filed on Feb. 11, 2000, and provisional application No. 60/182,106, filed on Feb. 11, 2000.

(30) Foreign Application Priority Data

Dec. 17, 1999 (CA) .................................................. 2292684

(51) Int. Cl.[7] ..................................................... F01B 29/10
(52) U.S. Cl. ................................. 60/520; 60/524; 60/526
(58) Field of Search .............................. 60/517, 518, 520, 60/522, 523, 524, 526, 508, 515

(56) References Cited

U.S. PATENT DOCUMENTS

| | | | |
|---|---|---|---|
| 2,833,523 | 5/1958 | Haan ......................................... 257/6 |
| 3,183,963 | 5/1965 | Mondt ..................................... 165/10 |
| 3,972,370 | 8/1976 | Malaval ............................... 165/163 |
| 4,434,617 | 3/1984 | Walsh ..................................... 60/520 |
| 4,527,394 | 7/1985 | Corey ..................................... 60/517 |
| 4,532,771 | 8/1985 | Momose et al. ........................... 62/6 |
| 4,642,988 | 2/1987 | Benson ............................... 60/641.14 |
| 4,671,064 | * | 6/1987 | White et al. ............................ 60/517 |
| 4,745,749 | 5/1988 | Benson ................................... 60/518 |
| 4,802,332 | * | 2/1989 | Beale ...................................... 60/520 |
| 4,840,032 | 6/1989 | Claudet et al. ............................ 62/6 |
| 4,866,943 | 9/1989 | Purcell et al. .............................. 62/6 |
| 4,901,787 | * | 2/1990 | Zornes ..................................... 165/4 |
| 4,984,428 | 1/1991 | Momose et al. ........................ 60/517 |
| 5,005,349 | 4/1991 | Momose et al. ........................ 60/517 |
| 5,113,659 | 5/1992 | Baker et al. .......................... 60/641.8 |
| 5,142,872 | 9/1992 | Tipton ........................................ 62/6 |
| 5,214,923 | 6/1993 | Kown ........................................ 62/6 |
| 5,329,768 | 7/1994 | Moscrip ................................. 60/518 |
| 5,388,410 | 2/1995 | Momose et al. ........................ 60/526 |
| 5,429,177 | 7/1995 | Yaron et al. ............................ 165/10 |
| 5,433,078 | 7/1995 | Shin ....................................... 60/517 |

(List continued on next page.)

FOREIGN PATENT DOCUMENTS

| | | |
|---|---|---|
| 472080 | 3/1951 | (CA) . |
| 641574 | 5/1962 | (CA) ..................................... 257/17 |
| 771048 | 11/1967 | (CA) ...................................... 257/8 |
| 584648 | 10/1969 | (CA) . |
| 2273931 | 6/1998 | (CA) . |
| 37 21 143 A1 | 1/1989 | (DE) . |
| 195 39 379 A1 | 4/1997 | (DE) . |
| 2 290 351 | 12/1995 | (GB) . |

OTHER PUBLICATIONS

Senft, James R., An Introduction to Stirling Engines, 1993, pp. 1–80.

*Primary Examiner*—Hoang Nguyen
(74) *Attorney, Agent, or Firm*—Philip C. Mendes da Costa; Bereskin & Parr

(57) ABSTRACT

A heat engine is constructed from sheet metal and the like. The heat engine has an outer container and inner container which contains a displacer and a power piston. A plurality of positioning members are provided to dimensionally stabilize the inner and outer containers. By providing positioning members that extend between the inner and the outer containers, a sandwiched construction is obtained which allows the inner and outer containers to reinforce each other thus permitting the use of thin walled containers and improving the thermal efficiency of the heat engine and decreasing the weight of the heat engine.

36 Claims, 25 Drawing Sheets

U.S. PATENT DOCUMENTS

| | | | |
|---|---|---|---|
| 5,675,974 | 10/1997 | Heikrodt et al. | 62/6 |
| 5,715,683 | 2/1998 | Hofbauer et al. | 62/6 |
| 5,809,784 | 9/1998 | Kreuter | 60/650 |
| 5,878,570 | 3/1999 | Reithofer | 60/520 |
| 6,049,146 | 4/2000 | Takara | 310/24 |

* cited by examiner

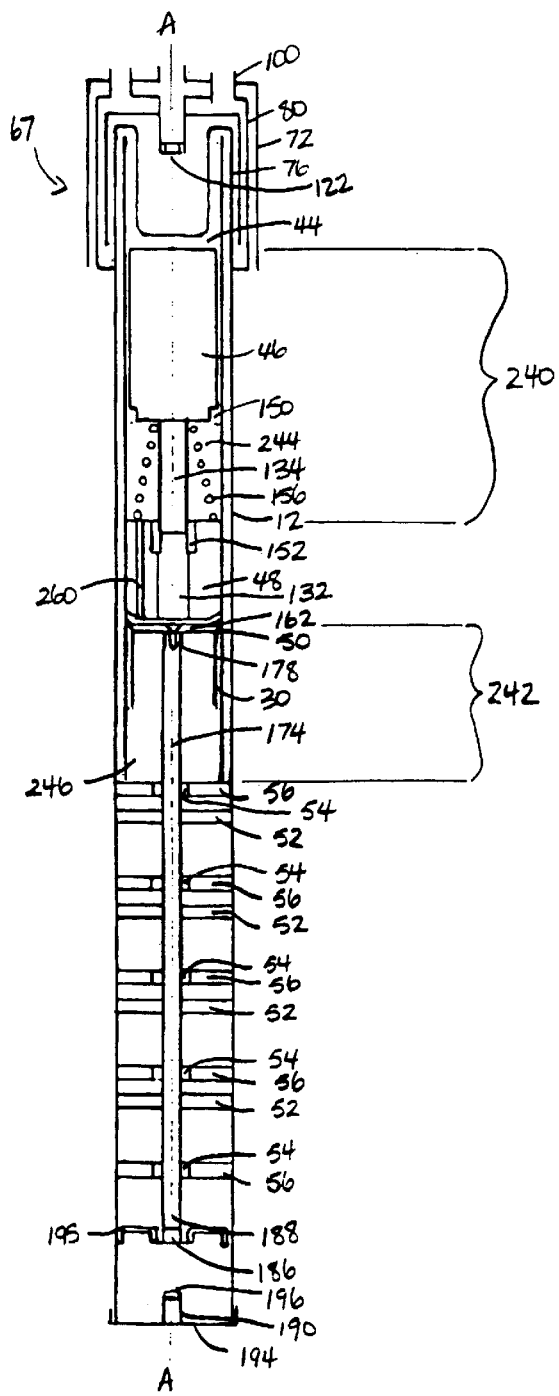
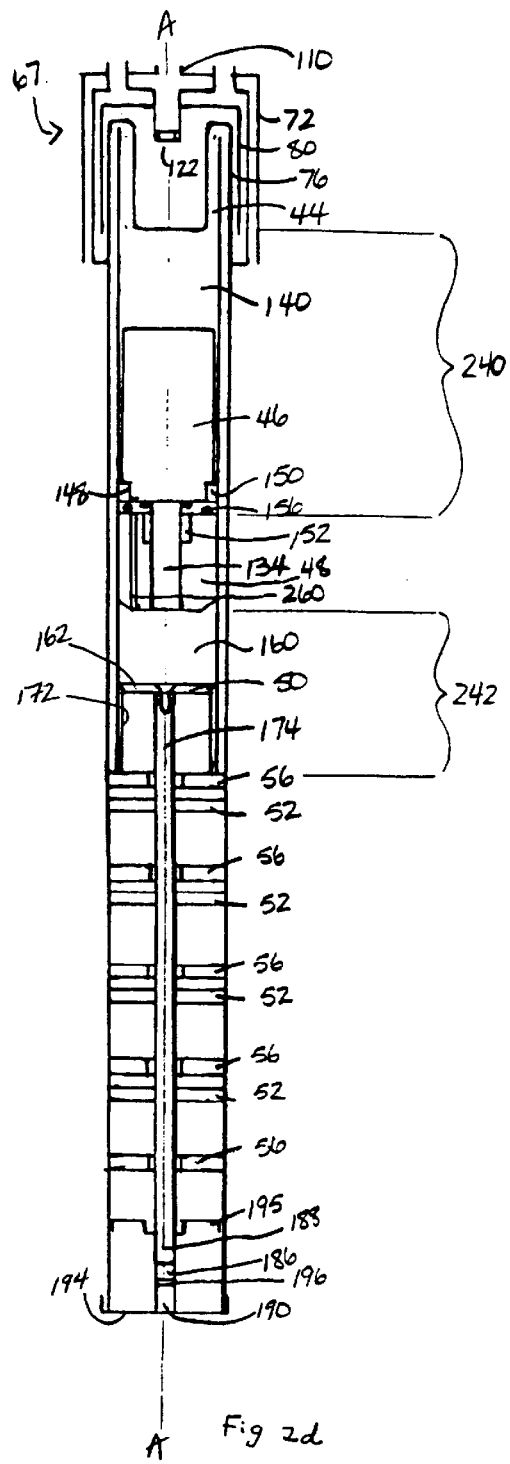
Fig 2c
Fig 2d

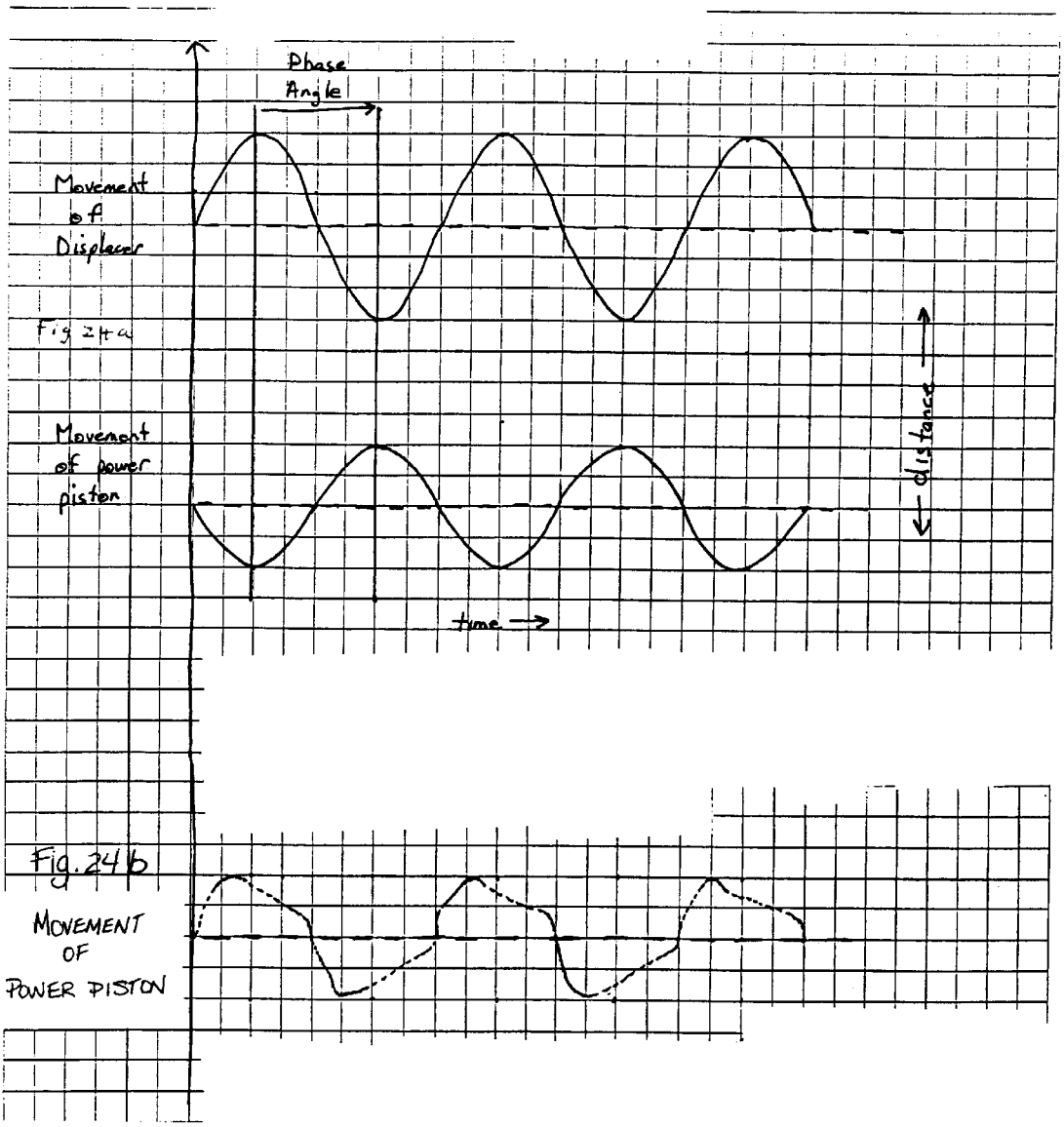

HEAT EXCHANGER FOR A HEAT ENGINE

This application claims the benefit of U.S. Provisional Application No. 60/182,050, filed Feb. 11, 2000, U.S. Provisional Application No. 60/182,105, filed Feb. 11, 2000, and U.S. Provisional Application No. 60/182,106, filed Feb. 11, 2000.

FIELD OF THE INVENTION

This invention relates to a heat engine.

BACKGROUND OF THE INVENTION

The heat engine is an alternate engine to the internal combustion engine. Various designs for heat engines have been developed in the past. Despite its potential for greater thermodynamic efficiency compared to internal combustion engines, heat engines have been used in only limited applications in the past due to several factors including the complexity of the designs, the weight of the engine per unit of horse power output as well as the difficulty in starting a heat engine.

SUMMARY OF THE INVENTION

In accordance with the instant invention, an improved design for a heat engine is disclosed. In one embodiment, the heat engine is made from lightweight sheet metal. By using a plurality of cylindrical containers, one nested inside the other for the displacer, the combustion and cooling chambers as well as to create an air flow path between the heating and cooling chambers, a rugged durable lightweight construction is achieved.

In another embodiment, the heat engine utilizes a power piston which is biased to a first position. By biasing the piston, several advantages are obtained. First, the heat engine may be self starting provided the power piston is biased so as to be initially positioned in the cooling chamber. A further advantage is that by using an electrical means (eg. a solenoid, an electromagnet or the like) to move the displacer, preferably in response to the position of the power piston, a complicated mechanical linkage between the power piston and the displacer is not required thus simplifying the design. Further, by using an electrical linkage, the phase angle between the displacer and the power piston may be adjusted.

The heat engine of the instant invention may be combined with a fuel source (eg. butane), a linear generator and an electrically operated light emitting means to create a flashlight or other portable light source. It will be appreciated that due to the simplicity of the design of the instant invention, the heat engine as well as the linear generator are each adapted to be scaled up or down so as to produce greater or lessor amounts of power. Accordingly, in another embodiment, the heat engine together with a linear generator and a fuel source may be used as a generator. It will further be appreciated that by connecting a linear generator to a source of electricity (eg. standard electrical outlet) the electricity from a power grid may be used to run the linear generator as a motor whereby the power piston effectively drives the displacer. In such a case, the heat engine may be used as a refrigerator or a cryogenic cooler. In such an embodiment, the heating and cooling chambers of the heat engine are effectively reversed and no combustion chamber is required.

In accordance with one aspect of the instant invention, there is provided a heat engine comprising an outer longitudinally extending wall, an inner longitudinally extending wall spaced from the outer longitudinally extending wall to define a first passageway, each wall having an inner surface and an outer surface, the inner wall surrounding a cavity, each of the inner and outer walls having longitudinally spaced apart first and second ends, a heat source mounted at the first end and spaced from the inner wall to define a second passageway, the first and second ends in fluid flow communication via the first and second passageways, the first and second ends and the first and second passageways defining a sealed region within which a working fluid is circulated; a displacer movably mounted in the cavity; a piston movably mounted in the second end; a first heat exchanger mounted in the first passageway comprising at least one fin having first and second opposed sides and constructed to direct the working fluid as it flows through the first heat exchanger to enhance heat transfer between the working fluid and the first heat exchanger; and, a second heat exchanger mounted in the second passageway comprising at least one fin having first and second opposed sides and constructed to direct the working fluid as it flows through the second heat exchanger to enhance heat transfer between the working fluid and the second heat exchanger.

In one embodiment, the heat source comprises a combustion chamber mounted at the first end, the burner chamber is in fluid flow communication with an exhaust gas passageway and a portion of the exhaust gas passageway is positioned adjacent the first passageway.

In another embodiment, the heat engine further comprises a third heat exchanger mounted in the exhaust gas passageway and comprising at least one fin having first and second opposed sides and constructed to direct the exhaust gas as it flows there through to enhance heat transfer between the exhaust gas and the third heat exchanger.

In another embodiment, the inner wall is cylindrical and the heat source is mounted substantially within the inner wall whereby the second passageway is annular.

In another embodiment, the at least one fin is configured and arranged to permit fluid to flow from the first opposed side to the second opposed side and to direct fluid from the second opposed side to the first opposed side.

In another embodiment, the at least one fin has main directing members and fluid flow passages through which the fluid may pass through the fin, the main directing members are configured and arranged to cause a portion of the fluid which has passed through the fin from the first opposed side to the second opposed side to then pass from the second opposed side to the first opposed side.

In another embodiment, the at least one fin is configured and arranged to cause at least a portion of the fluid to swirl around the passageway within which the at least one fin is positioned.

In another embodiment, at least some of the fins are constructed from metal and are prepared by stamping.

In another embodiment, at least some of the fins have a deformable collar for lockingly engaging the wall to which the fin is attached.

In another embodiment, at least some of the fins are mechanically mounted to at least one wall of the heat exchanger by a pressure which is exerted between the fins and the at least one wall which is sufficient to ensure that the rate of heat transfer between the at least one wall and the fins is maintained over the normal operating temperature of the at least one wall.

In another embodiment, the at least one fin comprises a plurality of longitudinally spaced apart fins and/or a helical fin.

In another embodiment, at least one of the main directing members is configured and arranged to cause a portion of the fluid to pass at least twice through the main directing member as the fluid flows through the fin.

In another embodiment, at least one of the main directing members has a first side, a second side and is configured and arranged to cause a portion of the fluid to flow unidirectionally from the first side of a main directing member to the second side of the main directing member as the fluid flows through the fin.

In another embodiment, the at least one fin has at least one main directing member which is configured and arranged to cause a portion of the fluid to pass at least twice through the main directing member as the fluid flows through the fin.

In another embodiment, the at least one fin has at least one main directing member, the main directing member having a first side, a second side and is configured and arranged to cause a portion of the fluid to flow unidirectionally from the first side of a main directing member to the second side of the main directing member as the fluid flows through the fin.

In another embodiment, the at least one fin has a hub adjacent a wall of the passageway within which the at least one fin is positioned and an annular body portion extending away from the hub, and openings and main directing members are provided in the annular body portion.

In another embodiment, the at least one fin has a hub adjacent a wall of the passageway within which the at least one fin is positioned and a plurality of blades extending away from the hub, the blades defining passages through which the fluid flows.

In accordance with the instant invention, there is also provided a heat engine comprising a container defining a sealed region within which a working fluid is circulated when the heat engine is in use, the sealed region having first and second portions, the first portion is at a different temperature than the second portion when the heat engine is in use, the first and second portions being in fluid flow communication via a working fluid passageway; a displacer movably mounted in the sealed region; a piston movably mounted in the sealed region; a combustion chamber positioned to provide heat to one of the first and second portions of the sealed region; and, a heat exchanger having a combustion air passageway for providing air for combustion to the combustion chamber and an exhaust gas passageway for withdrawing exhaust gas from the combustion chamber, a portion of the working fluid passageway is contained in the heat exchanger, a portion of the combustion air passageway is thermally connected to a portion of the exhaust air passageway and a portion of the working fluid passageway is thermally connected to a portion of the exhaust air passageway, at least one of the passageways having fin portions having first and second opposed sides and constructed to direct a fluid to flow through the second heat exchanger to enhance heat transfer between the fluid and the heat exchanger.

In one embodiment, at least some of the fin portions are configured and arranged to permit fluid to flow from the first opposed side to the second opposed side and to direct fluid from the second opposed side to the first opposed side.

In another embodiment, at least some of the fin portions have main directing members and fluid flow passages through which the fluid may pass through the fin, the main directing members are configured and arranged to cause a portion of the fluid which has passed through the fin from the first opposed side to the second opposed side to then pass from the second opposed side to the first opposed side.

In another embodiment, at least some of the fin portions are configured and arranged to cause at least a portion of the fluid to swirl around the passageway within which the fin portions are positioned.

In another embodiment, at least some of the fin portions comprise a plurality of longitudinally spaced apart fins and/or a helical fin.

In another embodiment, at least one fin is mechanically affixed to at least one wall of the passageway within which the at least one fin is positioned by a pressure which is exerted between the at least one fin and the at least one wall that is sufficient to ensure that the rate of heat transfer between the at least one wall and the at least one fin is maintained over the normal operating temperature of the heat engine.

In another embodiment, at least one fin has at least one main directing member which is configured and arranged to cause a portion of the fluid to pass at least twice through the main directing member as the fluid flows through the fin.

In another embodiment, at least one fin has at least one main directing member which has a first side, a second side and is configured and arranged to cause a portion of the fluid to flow unidirectionally from the first side of a main directing member to the second side of the main directing member as the fluid flows through the fin.

In another embodiment, at least one fin has at least one main directing member which is configured and arranged to cause a portion of the fluid to pass at least twice through the main directing member as the fluid flows through the fin.

In another embodiment, at least one fin has at least one main directing member, the main directing member having a first side, a second side and is configured and arranged to cause a portion of the fluid to flow unidirectionally from the first side of a main directing member to the second side of the main directing member as the fluid flows through the fin.

In accordance with the instant invention, there is also provided a heat engine comprising container means defining a sealed region within which a working fluid is circulated when the heat engine is in use, the sealed region having first and second portions, the first portion is at a different temperature than the second portion when the heat engine is in use; combustion means for providing heated exhaust gas for heating the first portion; combustion air conduit means for providing air for combustion to the combustion means; fluid conduit means for connecting the first and second ends in fluid flow communication; exhaust gas conduit means for conveying exhaust gas from the combustion means; and, heat exchanger means comprising fin means for transferring heat between the exhaust gas and at least one of the air for combustion and the working fluid.

In one embodiment, the heat exchanger means comprises fin means for transferring heat between the exhaust gas and each of the air for combustion and the working fluid.

In another embodiment, the heat exchanger means is constructed to generate a generally longitudinal flow of fluid through the heat exchanger means.

In another embodiment, the heat exchanger means is constructed to generate a rotational flow of fluid through the heat exchanger means.

In another embodiment, the fin means comprises a plurality of spaced apart fin portions having first and second opposed sides, at least some of the fin portions having fluid directing means for directing the fluid from the first opposed side to the second opposed side and from the second opposed side to the first opposed side.

In another embodiment, the fin means comprises a plurality of spaced apart fin portions having first and second opposed sides, at least some of the fin portions having fluid directing means for directing fluid to flow rotationally through the heat exchanger means.

In another embodiment, the fin means has mounting means for producing a sufficient pressure between the fin means and the portion of the heat engine to which the fin means is mounted to ensure that the rate of heat transfer between the heat engine and the fin means is maintained over the normal operating temperature of the heat engine.

DESCRIPTION OF THE DRAWINGS

For a better understanding of the present invention, and to explain more clearly how it may be carried into effect, reference will now be made by way of example to the accompanying drawings which show preferred embodiments of the present invention, in which:

FIG. 2b is a cross section along the line 2—2 of FIG. 1 configured as a flashlight with the heat exchanger for the fresh air for combustion removed, with the displacer positioned distal to the heater cup and the power piston positioned at the beginning of the power stroke;

FIG. 2c is a cross section along the line 2—2 of FIG. 1 of an alternate embodiment with the displacer positioned adjacent the heater cup and the power piston positioned at the end of the power stroke;

FIG. 2d is a cross section along the line 2—2 of FIG. 1 of an alternate embodiment with the displacer positioned distal to the heater cup and the power piston positioned at the beginning of the power stroke;

FIG. 6d is an enlargement showing the air flow through the heat exchanger for the regeneration zone of FIG. 6a;

DESCRIPTION OF PREFERRED EMBODIMENT

Figure 1:
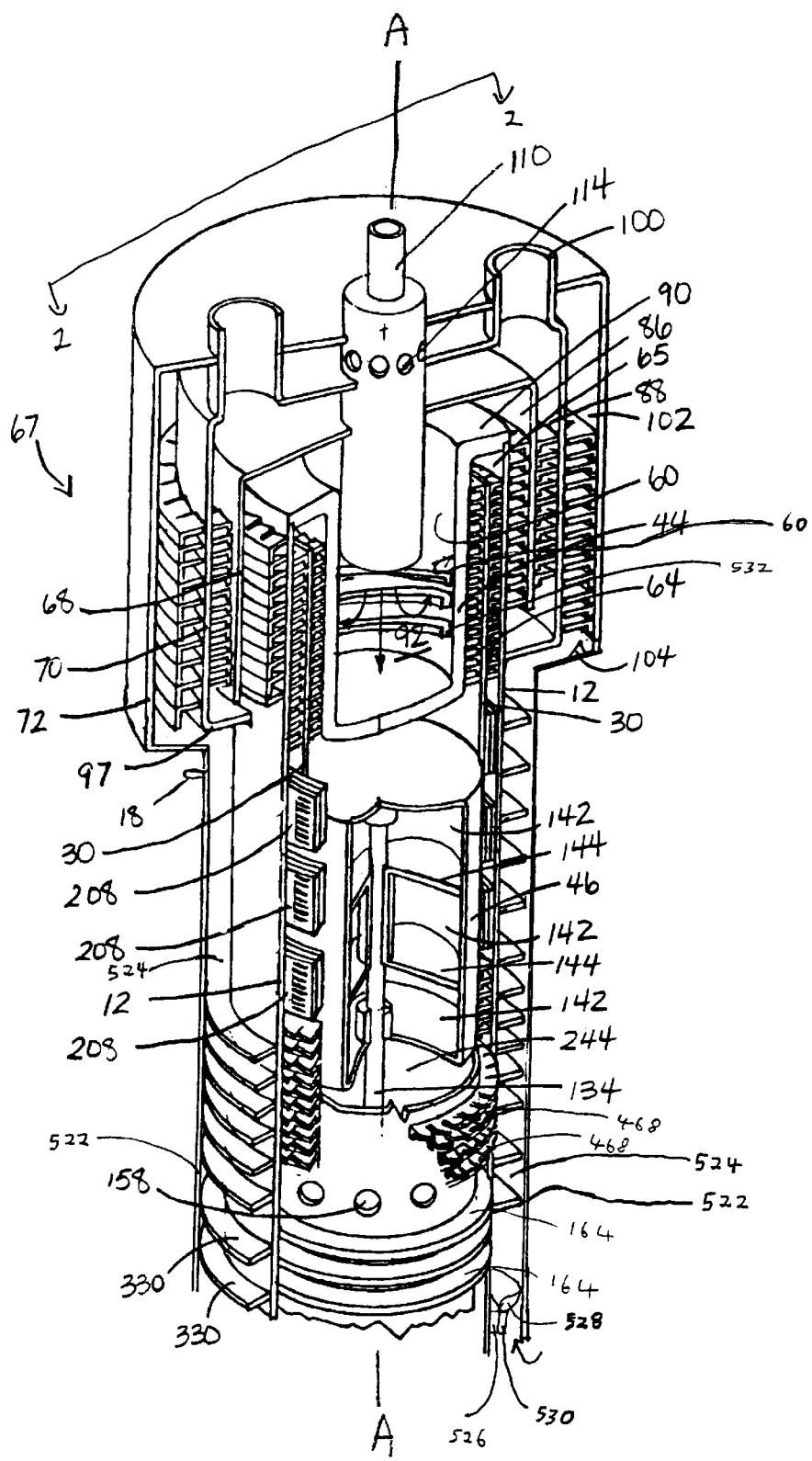
FIG. 1 is a partially cut away perspective view of a heat engine according to the instant invention.

The heat engine described herein contains several novel design innovations including the construction of the heat engine from sheet metal or the like, the construction and positioning of the heat exchangers (including the regenerator), the drive system for the displacer and the power piston so as to allow different cycles for the displacer and the power piston, the feedback system for controlling the amount of heat (energy) provided to the working fluid and the ability to synchronize the frequency of several generators to allow their series or parallel connection to a load.

In the preferred embodiments of FIGS. 1–4, 7, 9–11, 19 and 20 the heat engine includes a linear generator as the power piston. In an alternate preferred embodiment, the heat engine includes a mechanical linear to rotary converter which are known in the art. Design innovations of this disclosure may be used with either preferred embodiment. Accordingly, similar parts have been referred to by the same reference numeral in all embodiments.

In accordance with the embodiments of FIGS. 2a, 2b, 2e and 7, a light bulb is incorporated into the housing of the heat engine and so as to provide a portable flashlight. The heat engine is drivingly connected to a linear generator which is used to create current to power one or more incandescent light bulbs, fluorescent light bulbs, LEDs, gas plasma discharge light sources or the like. It will be appreciated that the heat engine may be powered by any heat source known in the art. In a preferred embodiment, the flashlight housing includes a fuel reservoir which, upon combustion, provides heat to power the heat engine. Accordingly, the flashlight comprises four main components namely a heat source, a heat engine, an linear generator and a light emitting device (eg. a light bulb). It will also be appreciated that the linear generator may be used to provide power for any required purpose and that the heat engine and the linear generator may be configured as a generator or may be connectable to an electric motor or any other application that requires electricity (i.e. the load). In any such application, the component to which the linear generator provides electricity may be housed with the heat engine and the linear generator of the may be a separate discrete component.

As shown in the drawings attached hereto, the components are shown set out in a linear array (i.e. they are positioned sequentially along longitudinal axis A of the flashlight). However, it will be appreciated that the components may be set up in various configurations. For example, the fuel reservoir need not be positioned directly in line with the heat engine. Similarly, the light bulb or other powered component need not be positioned along longitudinal axis A of the flashlight but may be positioned at any desired point by adjusting the shape of the outer housing and providing a sufficient length of wire to connect the light bulb or other powered component to the linear generator. Alternately, the housing of the heat engine and the linear generator may have an electrical outlet for receiving a standard electric plug.

The following description is based on the flashlight model which has a single light bulb. However, the device, complete with an on board heat source (eg. a reservoir filled with a combustible fuel and a combustion chamber), creates a self contained, light weight light source which may be in the form of a flash light, a portable camping light, a lamp or the like. In this application, the flashlight has been described as if it were standing vertically on a table with bulb 48 positioned at the bottom. References to upper and lower, vertical or horizontal in this application are for reasons of convenience based upon this orientation of the flashlight in the drawings. It will be appreciated that the heat engine and the linear generator may be used when the housing of the apparatus is in any orientation.

Thin Walled Construction

According to one aspect of the instant invention, a novel construction of a heat engine is provided which uses thin walled structures to house the working or moving components of the heat engine (i.e. displacer 46 and power piston 50) within a working container having first and second ends. The working fluid is circulated between the first end of the working container which is warmer than the second end. In contrast to earlier designs wherein the working container is prepared from a block of metal which is machined to produce a space within which the working fluid circulates or which is forged, this design uses sheet metal and the like to form a container. Positioning members are provided to dimensionally stabilize the walls of the container thereby providing a durable structure. Due to the construction materials used, the heat engine is light weight and has good thermal efficiency since the thin walled construction allows for faster heat transfer to and from the working fluid and significantly reduced heat retention by the components of the heat engine.

In a more preferred embodiment, the working container is an inner container which is housed within an outer housing and the positioning members extend between the outer housing and the working container at a plurality of locations along the length of the working container. The positioning members may be provided only at the longitudinally opposed ends of the inner container. For example, the positioning means may be affixed to the opposed ends of the inner and/or outer containers and extend generally parallel to the longitudinal axis of the heat engine to draw the opposed ends together (eg. a bolt and a butterfly nut), in which case they function as clamping means to draw the opposed ends together and seal the inner cavity. Preferably, the positioning means extends generally transverse to the longitudinal axis of the heat engine. In such a case, if the passageway through which the working fluid travels between the first and second ends of the inner container is positioned in the space between the outer housing and the inner container, then the positioning members are configured to allow fluid flow there through. The positioning members may also function as heat exchangers and/or a regenerator thereby reducing the number of components required for constructing a heat engine. More preferably, the outer housing is also of a thin walled construction.

As in the embodiment of FIG. 1, the container may be open topped wherein the combustion chamber is positioned at least partially within and preferably wholly within the inner container and is used to dimensionally stabilize the top of the inner container. The combustion chamber is constructed from materials which will maintain their structural integrity at combustion temperatures and therefore, the combustion chamber may be prepared by standard construction techniques for turbine engine components (eg. stamping components out of a super nickel alloy to maximize heat transfer by minimizing the wall thickness).

Figure 2A:
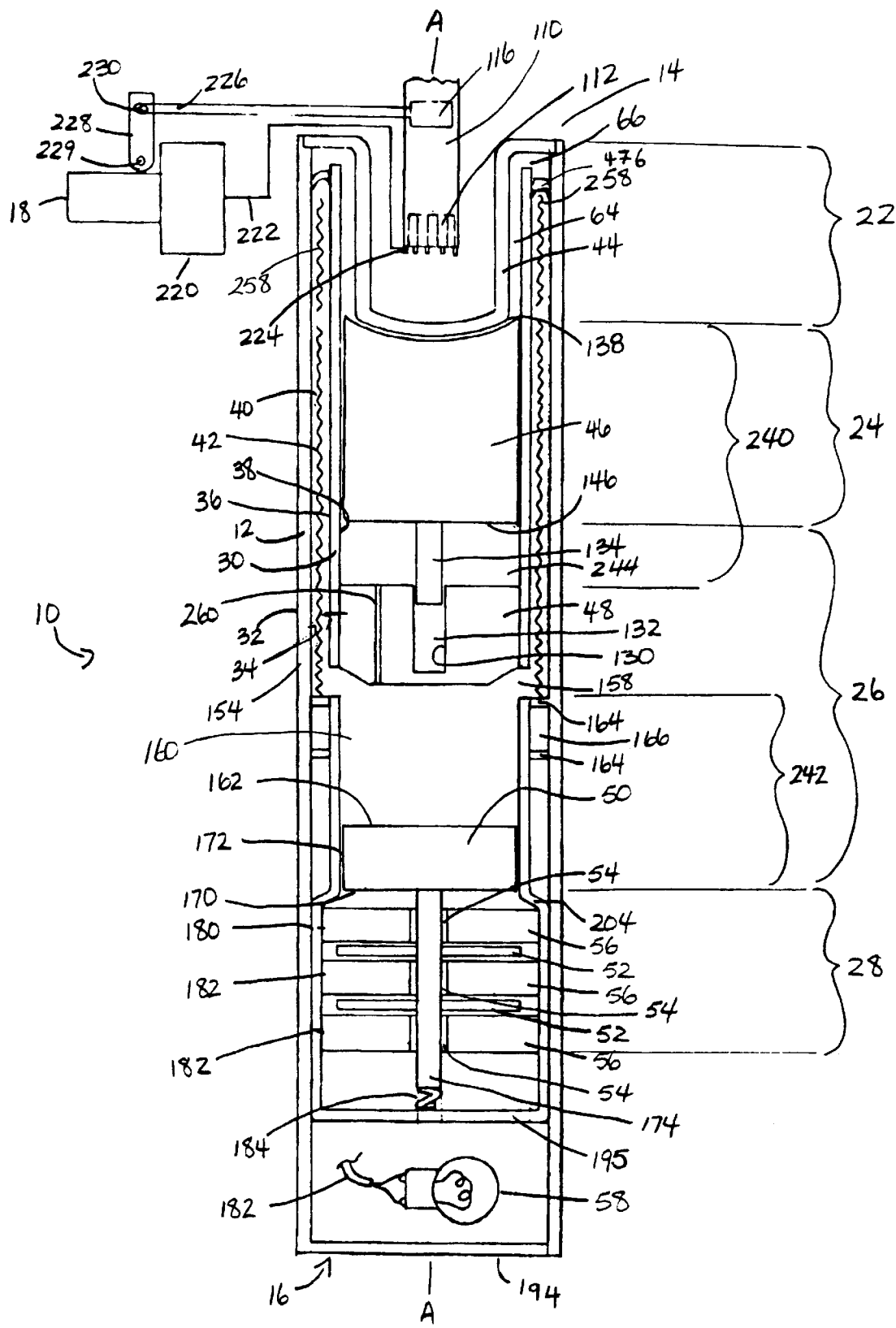
FIG. 2a is a cross section along the line 2—2 of FIG. 1 of a heat engine configured as a flashlight with the heat exchanger for the fresh air for combustion removed, with the displacer positioned adjacent the heater cup and the power piston positioned at the end of the power stroke.
Figure 26:
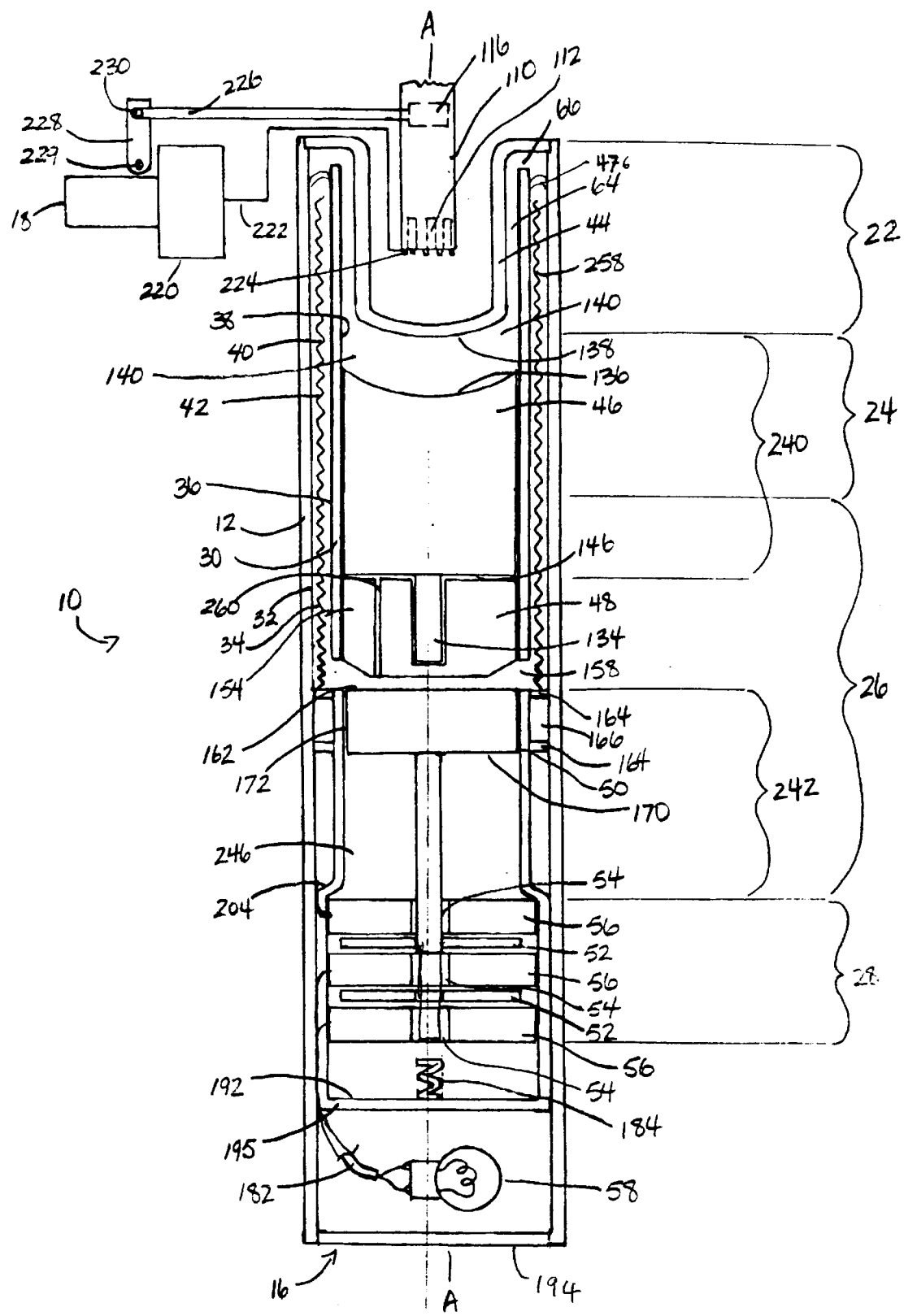
Figure 2E:
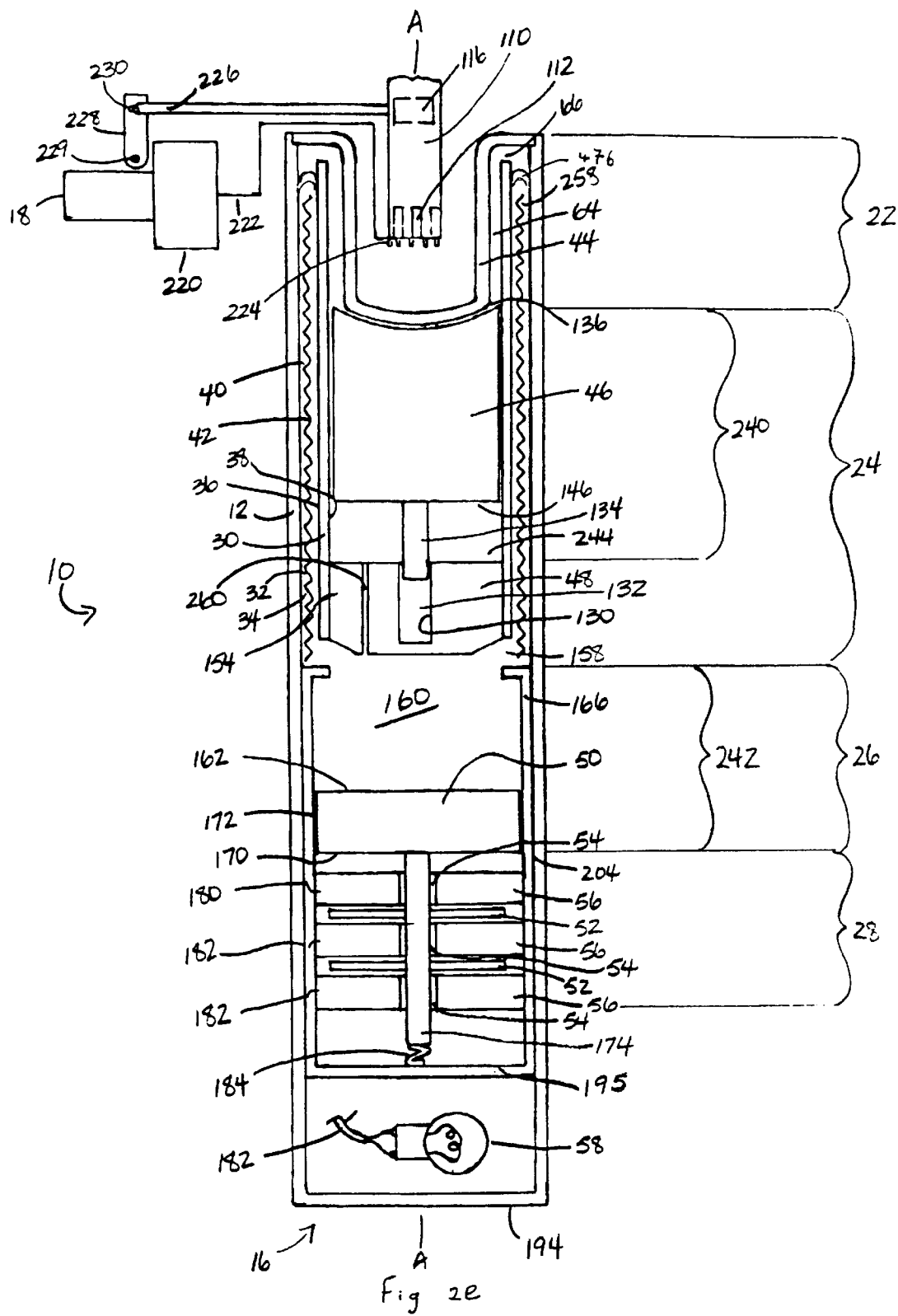
FIG. 2e is a cross section along the line 2—2 of FIG. 1 of a further alternate embodiment configured as a flashlight with the displacer positioned adjacent the heater cup and the power piston positioned at the end of the power stroke.

FIGS. 1, 2a, 9–11, 19 and 20 exemplify this construction. Referring to FIG. 2a, a flashlight 10 is shown with each of the components set out in a longitudinally extending array inside outer wall 12. Outer wall 12 has a first end 14 and a second end 16. A start or ignition button 18 is provided, preferably on the longitudinally outer wall 12.

As shown in FIGS. 2a–2d, flashlight 10 comprises a heating zone 22, a regeneration zone 24, a cooling zone 26 and an electrical generation zone 28. Flashlight 10 is provided with a housing to include the components for each of these four zones. The housing comprises outer wall 12 and inner wall 30 which are preferably coaxially positioned about longitudinal axis A (see FIG. 1). While the housing which is shown in the drawings comprises nested cylinders, it will be appreciated that the housing may comprise inner and outer containers that may be of any shape and need not be coaxially mounted. Further, the housing may allow any configuration of the components provided the electrical generation means is drivingly connected to the heat engine.

Outer wall 12 has an outer surface 32 and an inner surface 34. Inner wall 30 has an outer surface 36 and an inner surface 38. Inner surface 34 of outer wall 12 and outer surface 36 of inner wall 30 are spaced apart to define an outer cavity which may be used as annular fluid flow path 40 within which regenerator 42 is preferably positioned. The construction techniques of this design may be used in configurations of heat engines that do not include a regenerator or which do not position the regenerator in an annular passageway exterior to the inner cavity within which the displacer is positioned.

In the preferred embodiment of FIGS. 2a and 2b, positioned inside inner wall 30 are heater cup 44, displacer 46, driver 48 for moving displacer 46, power piston 50 and a linear generator comprising a plurality of magnets 52, ferrite beads 54 and coils 56. Light bulb 58 is mounted at second end 16 of outer wall 12.

Figure 3:
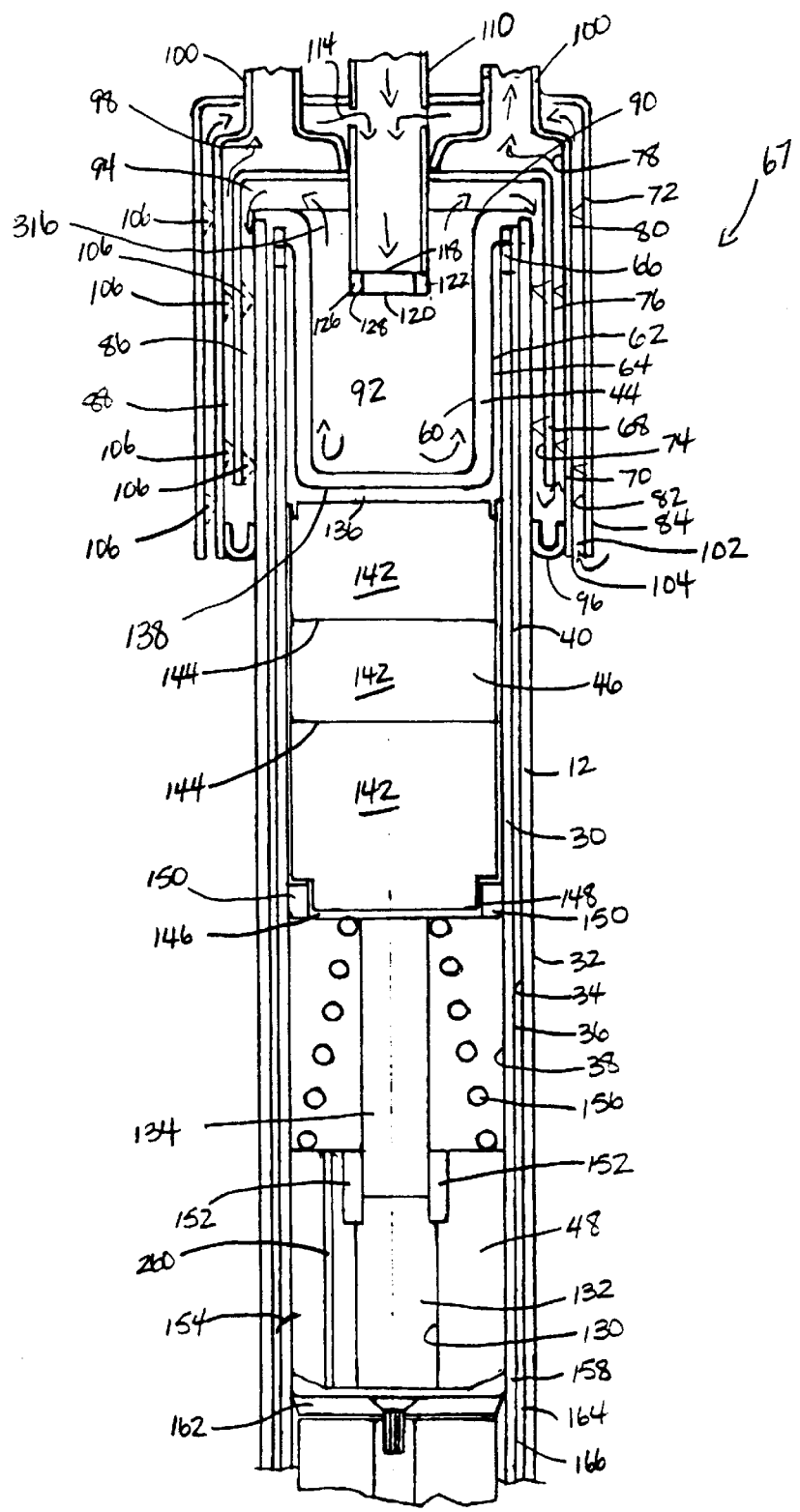
FIG. 3 is an enlargement of the heating and regeneration zones of the cross section of FIG. 2c.

As shown in FIG. 3, heater cup 44 has an inner surface 60 and an outer surface 62. Outer surface 62 is spaced from inner surface 38 of inner wall 30 so as to define a fluid flow path 64. Fluid flow path 64 is a first passageway that is in fluid flow communication with fluid flow path 40 by means of a plurality of spaced apart openings 66 which are provided in inner wall 30. Accordingly, fluid flow path 64 and openings 66 define a passageway connecting the interior of the upper portion of inner wall 30 (i.e. heating chamber 160) with fluid flow path 40. In the embodiment of FIG. 1, inner wall 30 terminates prior to top 90 of heater cup 44 thereby providing an annular space 64 through which the upwardly flowing working fluid passes as it travels from heating chamber 140 to annular fluid flow path 40. A plurality of positioning members to dimensionally stabilize the end of inner wall 30 adjacent heater cup 44 are provided in fluid flow paths 64 and 40. These positioning members may be in the form of rings that extend continuously around outer surface 62 and engage inner surface 38 of inner wall 30 to prevent inner wall from contracting inwardly when the heat engine is operating. These positioning members may also be constructed to assist in the transfer of heat to the working fluid. Examples of such positioning members are protrusions 106 (see FIG. 3), contact with wall of burner cup 44 (see FIG. 2a), spacer rings 164, 476 (see FIGS. 14 and 15), louvred fins 428, 440, 468 (see FIGS. 12, 12a, 12c, 12d and 13) and helical louvred fin 448 (see FIG. 16). In another alternate embodiment, inner and outer walls 30 and 12 may be two containers that are prepared by die stamping and then connected together at their open (top) ends by placing one container inside the other and spin welding the top ends together to form a double walled vessel. The portions of the containers that are spun welded together define an intermediate portion and openings 66 may be provided therein to allow heating chamber 140 to be in fluid flow communication with fluid flow path 40 (see eg. FIG. 3).

In the embodiment of FIGS. 2a and 2b, inner wall 30 has a swedged portion 204 at which point inner wall 30 has an increased diameter thereby bringing inner and outer walls 30 and 12 into engagement. This method of assembly is advantageous if inner wall 30 is prepared from a preformed cylindrical tube.

Figure 4:
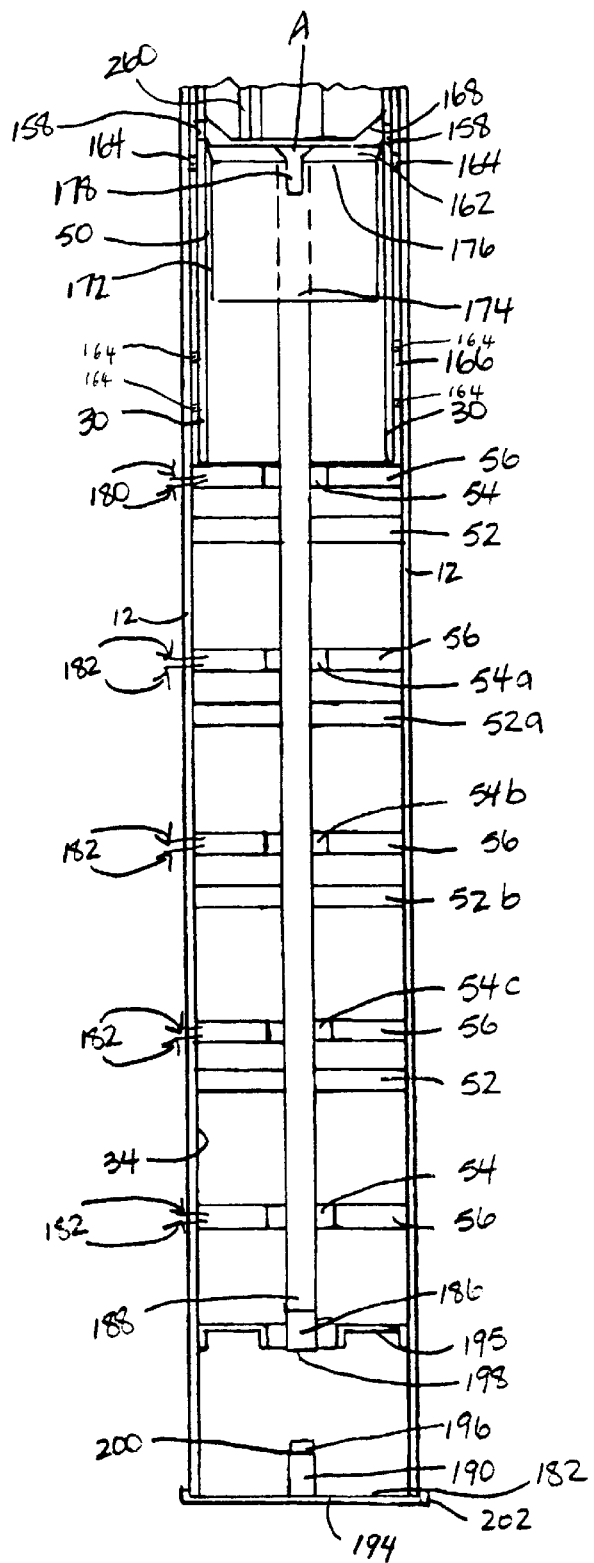
FIG. 4 is an enlargement of the cooling zone and linear generator of FIG. 2c.
Figure 15:
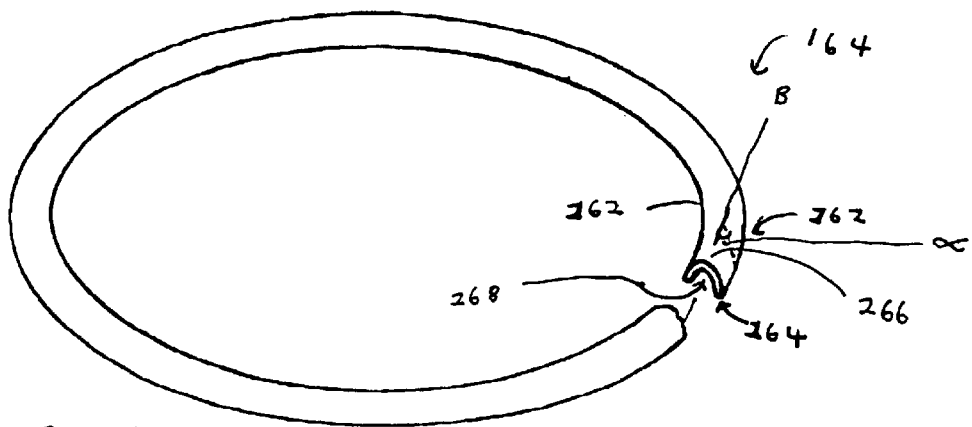
FIG. 15 is a perspective view of a further embodiment of a spacer ring.

This engagement, for example over the length of the electrical generator zone 28, maintains the co-axial alignment of the cylinders. In the embodiment of FIG. 4, outer wall 12 has a uniform diameter along its length and accordingly is maintained in a spaced apart relationship from inner wall 30 by, for example, a sealant which is inserted in gap 166 below openings 158 or by spacer rings 164. As shown in FIG. 15, spacer rings 164 may be generally annular members having a generally U shaped profile in cross section. As such, ring 164 has a pair of opposed edges 262 extending from upper end 264 to trough portion 266 to define an open area 268. Preferably, opposed edges 262 extend outwardly at a sufficient angle α to central axis B which extends through ring 164 so that upper ends 264 are compressed towards each other when ring 164 is inserted between outer and inner walls 12 and 30 thus providing a tight sliding fit to mechanical lock the cylinders together. A plurality of rings 164 which are spaced apart in gap 166 provides sufficient mechanical connection between outer and inner walls 12 and 30 so as to coaxially align them.

As is exemplified by FIG. 1, providing any such positioning members between spaced apart inner and outer walls creates a sandwiched construction wherein the inner and outer walls become mutually self supporting. By including a plurality of such spaced apart members, longitudinally spaced apart portions of, for example, outer wall 12 and inner wall 30 (e.g. positioned adjacent each of heater cup 44 and piston 50), may be in contact with each other and transmit stresses (either inwardly directed or outwardly directed forces) between the inner wall and the outer wall. By maintaining the relative position of the inner and outer walls, the positioning members allow the mechanical strength of the inner and outer walls to be combined.

For example, in the embodiment of FIG. 1, at the lower end of the heat engine, a plurality of rings 164 are provided. At the upper end, inner wall 30 is dimensionally stabilized by louvred fins which are provided in both passageways 64 and 88 to thereby hold inner wall 30 and outer wall 12 at fixed positions with respect to heater cup 44.

In the embodiments of FIGS. 2a–2d, a gap 166 exists between inner and outer walls 30 and 12 below the upper extent of travel of piston 50. The gap between inner and outer walls 30 and 12 is sealed so as to cause the working fluid to enter cooling chamber 160 and act on piston 50. Preferably, the gap is sealed immediately below openings 158 so as to prevent working fluid from entering gap 166 which would function as a dead zone in the heat engine. This gap may be sealed in several ways. For example, one or more rings 164 may be provided to seal gap 166. In an alternate embodiment, a sealant (eg. epoxy) may be applied to fill all or a portion of gap 166. In the alternate embodiment of FIG. 2e, inner wall 30 is swedged outwardly immediately below openings 158 such that inner and outer walls 30 and 12 are positioned adjacent each other in the cooling zone. The positioning of inner and outer walls 30 and 12 adjacent each other or the use of epoxy are additional examples of positioning members as they utilize the interplay between the inner and outer walls 30 and 12 to stabilize inner and outer walls 30 and 12.

In a preferred embodiment, inner wall 30 and outer wall 12 are each of a "thin walled" construction. For example, each of inner wall 30 and outer wall 12 may be made from a metal such as aluminum, stainless steel, super metal alloys and the like, and are preferably made from stainless steel and the like. The wall thickness of cylinders 12 and 30 may vary from about 0.001 to about 0.250 inches, preferably from about 0.005 to about 0.125 inches, more preferably from about 0.01 to about 0.075 inches and, most preferably from about 0.02 to about 0.05 inches. Similarly, the walls of displacer 46 as well as the walls of piston 50 may be made from the same or similar materials. In larger heat engines (eg. those over 12 inches in diameter), the wall thickness is preferably selected so as to be greater than one sixtieth of the diameter of inner wall 30 and preferably about one thirtieth of the diameter of inner wall 30 when the wall is constructed for super nickel alloys and other similar materials whose strength is will not be significantly compromised at 600° C.

Accordingly, the main components of the heat engine may be constructed from sheet metal or the like using the same materials and in a manner that is similar to the containers which are used for soft drink cans or the like. In this preferred embodiment, inner and outer walls 30 and 12 are formed from prefabricated components (prepared eg. by stamping or drawing) which are then assembled together to form the heat engine. For example, inner and outer walls 30 and 12 may be prepared from sheet metal by roll forming the sheet metal and then laser welding the sheet metal to form a longitudinally extending tube. Alternately, metal may be drawn through a die to form a cylindrical tube. Openings 66 and 158 in inner wall 30 may then be made by stamping, drilling, laser cutting or the like. A circular bottom plate may be obtained from sheet metal by stamping and then roll formed or welded to the tube to produce an opened top container into which the power piston and the displacer may be placed. Alternately, a prefabricated open topped container may be formed by stamping metal using a high speed carbide die. This is in contrast to existing techniques for forming engines wherein a block of metal is cast and subsequently bored or the like to prepare the engine body thus resulting in an engine which is much heavier than is structurally required for a heat engine.

Similarly, displacer 46 may be manufactured from roll formed sheet metal which is then laser welded together. Bottom 146 and top 136 may then be affixed to the side walls by roll forming, welding, brazing, the use of an adhesive or the like. Divider plates 144 may be added as required in the manufacturing operation. Once sealed, displacer 46 provides a rugged construction which will withstand the heat and stresses applied to displacer 46 in the heat engine. A power piston may be constructed in a similar fashion.

Figure 21:
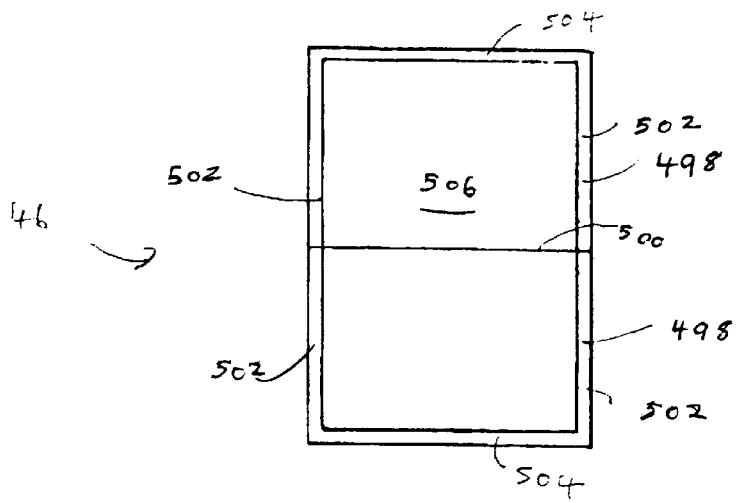
FIG. 21 is an assembly for a power piston or a displacer wherein the power piston of displacer is constructed from two containers that are weld ed together.
Figure 22:
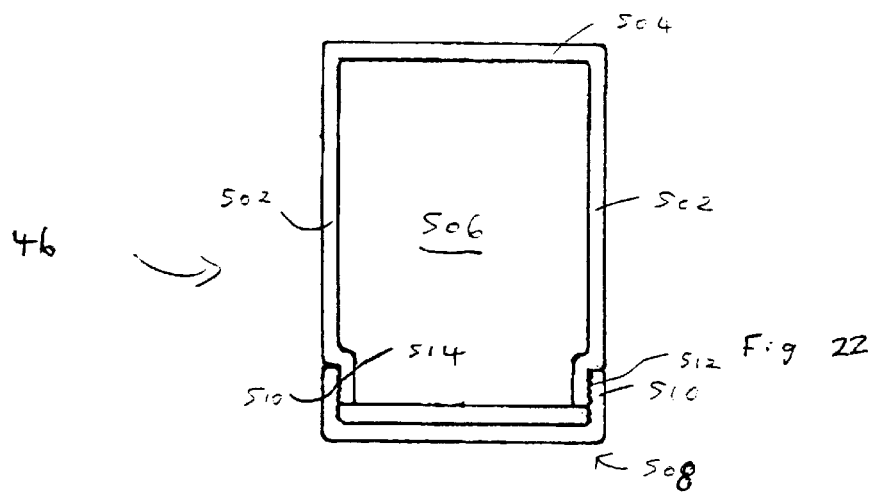
FIG. 22 is an assembly for a power piston or a displacer wherein the power piston of displacer is constructed from two containers that are threadedly engaged.
Figure 23:
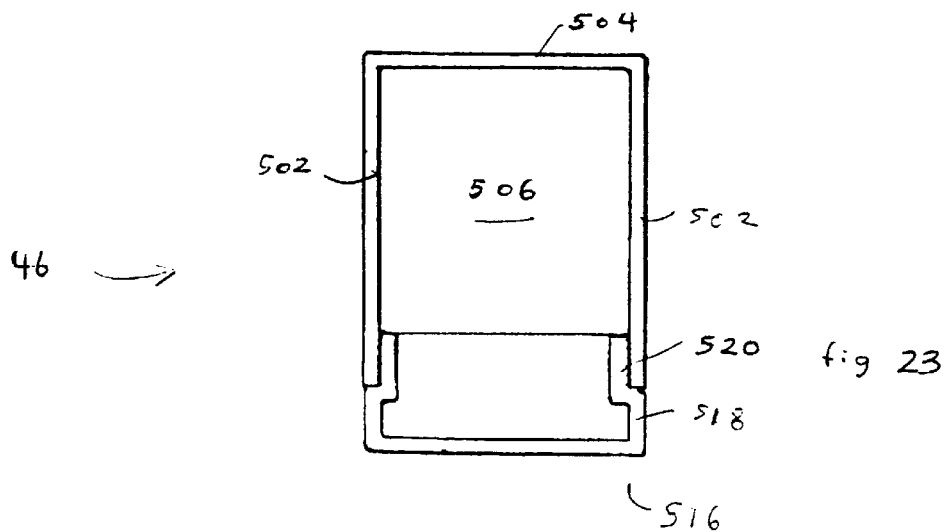
FIG. 23 is an assembly for a power piston or a displacer wherein the power piston of displacer is constructed from a first and second containers wherein the second container is press fitted into the opening of the first container; and, FIGS. 24a and b are graphs of the movement of the power piston compared to the movement of the displacer in one embodiment of the invention.

As shown in FIGS. 21–23, displacer 46 or power piston 50 may be constructed from two open topped containers 498 which are joined together, such as at the mid point of displacer 46 by welding along seam line 500. Each container comprises longitudinally extending side walls 502 and an end wall 504. Side walls and end walls 502 and 504 may be integrally formed such as by high speed carbide die stamping or, alternatively, side walls 502 may be prepared by drawings metal through a die to form a preformed longitudinally extending cylindrical tube and end wall 504 may be affixed thereto by roll forming or the like. It will be appreciate that welding seam 500 may be provided at any position along side walls 502. By providing end walls 504 to dimensionally stabilize the opposed ends of displacer 46, and by sealing side walls and end walls 502 and 504 of displacer 46 so as to contain a sealed cavity 506, the overall exterior structure of displacer 46 is sufficiently strong to act as a displacer (or a power piston) in a heat engine.

FIG. 22 shows an alternate embodiment wherein cap 508 is provided with walls 510 which have a thread 512 provided on the inner surface thereof. The distal portion of walls 502 from end 504 are recessed inwards slightly and have a mating thread 514 provided thereon. Accordingly, displacer 46 (or a power piston 50) may be constructed by providing an open topped vessel and screwing a cap 508 thereon.

A further alternate construction is shown in FIG. 23. In this case, a cap 516 is provided. Cap 516 has walls 518. Portion 520 of walls 518 are recessed inward slightly so as to provide a seat for the distal end of walls 502 to be received thereon. The diameter of the outer surface of walls 520 is slightly larger than the diameter of the inner surface of walls 502 so that portions 520 lockingly engage the inner surface of walls 502. In this way, a sealed displacer 46 (or power piston 50) may be provided. It will be appreciated that in the embodiments of FIGS. 22 and 23, one opposed end of walls 502 is stabilized by end wall 504 and the other opposed end of walls 502 is stabilized by cap 508, 518.

In order to reduce thermal transfers due to radiation and convection within displacer 46, displacer 46 may be divided into a plurality of chambers 142 by a plurality of divider plates 144 as is shown in FIGS. 1 and 3.

Pressurization

The durability of displacer 46 and/or the power piston may be further improved by pressurizing the interior of displacer 46 or the power piston. The degree to which displacer 46 and/or the power piston is pressurized is preferably based on the degree of pressurization of the working fluid in the heat engine. Preferably, displacer 46 and the power piston has a pressure from about −2 to about 10 atm, more preferably from about 1 to about 10 and, most preferably, from about 2 to about 4 atm greater than the pressure of the working fluid in the heat engine. In a similar manner, the structural integrity of walls 12 and 30 may be similarly enhanced by pressurizing the interior of the heat engine once it has been constructed. Preferably, the interior of the heat engine (i.e. where the working fluid circulates) is pressurized to a pressure from about 1 to about 20, more preferably from about 4 to about 10 atm. Thus, if the pressure of the working fluid is 4 atm, then the displacer may be at a pressure from 2 to 14 atm.

The working fluid may be any working fluid known in the art. For example, the working fluid may be selected from air and helium, and, is preferably helium. Helium has a high thermal conductivity which allows the heat engine to be operated at a higher operating frequency thus increasing the power output per unit volume of interior working space of the heat engine (i.e. the volume within which the working fluid circulates).

Dual Flow Heat Exchanger

In another aspect of this design, the heat engine includes a heat exchanger which uses the heat exchange fins described herein for transferring heat between the exhaust gas and at least one of the air for combustion and the working fluid and, preferably, for transferring heat between the exhaust gas and both the air for combustion and the working fluid. To this end, the heat exchanger comprises a first heat exchanger mounted in a first passageway comprising at least one fin having first and second opposed sides and constructed to direct the working fluid as it flows through the first heat exchanger to enhance heat transfer between the working fluid and the first heat exchanger; and, a second heat exchanger mounted in a second passageway comprising at least one fin having first and second opposed sides and constructed to direct the working fluid as it flows through the second heat exchanger to enhance heat transfer between the working fluid and the second heat exchanger. Optionally, the heat exchanger comprises a third heat exchanger mounted in the exhaust gas passageway and comprises at least one fin having first and second opposed sides and constructed to direct the exhaust gas as it flows there through to enhance heat transfer between the exhaust gas and the third heat exchanger.

Referring to the embodiment of FIG. 3, heater cup 44 is a combustion chamber which surrounded by a heat exchanger 67 comprising inner burner shield 68 having inner surface 74 and outer surface 76, outer burner shield 70 having inner surface 78 and outer surface 80 and air preheat shield 72 having inner surface 82 and outer surface 84 (see, eg., FIGS. 1 and 3,). Outer surface 84 of air preheat shield 72 is preferably at a temperature which may be comfortably handled by a user. It can be seen that when a flame is present, bottom 138 of burner cup 44 becomes hot and this heat is transferred to the working fluid. Wall 62 of the burner cup 44 is heated both by direct radiation from the flame and by contact with the hot exhaust gas 316 which come from the flame.

Inner surface 74 is spaced from outer surface 32 of outer wall 12 to define a first pass 86 for the exhaust gases. As the exhaust gas travels through first pass 86 (a combustion gas passageway), the working fluid in flow path 64 is heated. Similarly, inner surface 78 of outer burner shield 70 is spaced from outer surface 76 of inner burner shield 68 so as to define a second pass 88 for the exhaust gases (a combustion gas passageway). Inner surface 82 of air preheat shield 72 is spaced from outer surface 80 of outer burner shield 70 so as to define a preheat air flow path 102 (a combustion air passageway). The lower portions of outer burner shield 70 and air preheat shield 72 define entry port 104 to preheat air flow path 102. As the exhaust gas travels through second pass 88, the air for combustion in preheat air flow path 102 is heated. Depending upon the temperature of the exhaust gas and the thermal efficiency which is desired, a fewer number of passes or a greater number of passes may be utilized.

Heater cup 44 defines a combustion chamber 92. Inner burner shield 68 may be spaced from top 90 of heater cup 44 so as to define a manifold 94 through which the exhaust gases travel prior to entering first pass 86. At the bottom of first pass 86, an annular member 96 is positioned so as to force the exhaust gases to travel through second pass 88, if a second pass is desired, prior to entering second manifold 98 where the exhaust gases are redirected through cylindrical exit ports 100. Alternately, as shown in FIG. 1, outer burner shield 70 may have a transverse portion 97 to close the bottom of first pass 86.

Inner burner shield 68, outer burner shield 70 and air preheat shield 72 may be affixed together by any means known in the art. In the preferred embodiment of FIG. 3, the three shields and annular member 96 are constructed so as to be press fitted together. To this end, inner surfaces 74, 78 and 82 are each provided with a plurality of discrete protrusions which are spaced apart around each of the inner surfaces. The protrusions abut against the outer surface which is positioned immediately inwardly thereof so as to provide a seating means for positioning each shield with respect to the next inner member. For example, inner surface 74 of inner burner shield 68 is provided with a plurality of protrusions 106 which engage, at discrete locations, outer surface 32 of outer wall 12. The protrusions thereby allow inner burner shield 68 to be press fitted onto outer wall 12 and to remain seated at a spaced distance from outer surface 32 to define the fluid flow path. Similarly, annular member 96 may be installed by press fitting onto outer wall 12 prior to shields 68, 70 and 72 being installed. In the preferred embodiment of FIG. 1, a plurality of positioning members comprising one or more of spacer rings 164, 476, louvred fins 428, 440, 468 and helical louvred fin 448 are provided to dimensionally stabilize shields 68, 70 and 72 are provided in first and second passes 86 and 88 and preheat air flow path 102. These positioning members may also be constructed to assist in the transfer of heat.

In the preferred embodiment, a fuel, preferably an organic fuel, is combusted in heater cup 44 so as to provide heat for the heat engine. As shown in FIG. 3, the fuel may be a gaseous fuel (eg. butane). However, it will be appreciated that liquid or solid fuel (eg. paraffin) may be used. However, the heat engine may use any heat source (eg. a non-combustion exothermic chemical reaction that is preferably reversible) and in such a case, heat exchanger 67 may not be required.

In an alternate embodiment, the heat engine may be run in reverse with chamber 160 which is positioned adjacent piston 50 operating at a higher temperature than chamber 140. In such a case, heater cup 44 is replaced with a heat sink and a heat exchanger 67 may be provided to withdraw heat from chamber 140. Such a heat exchanger would not require a preheat air flow path but is otherwise preferably of a similar design.

Fuel Reservoir

Figure 7:
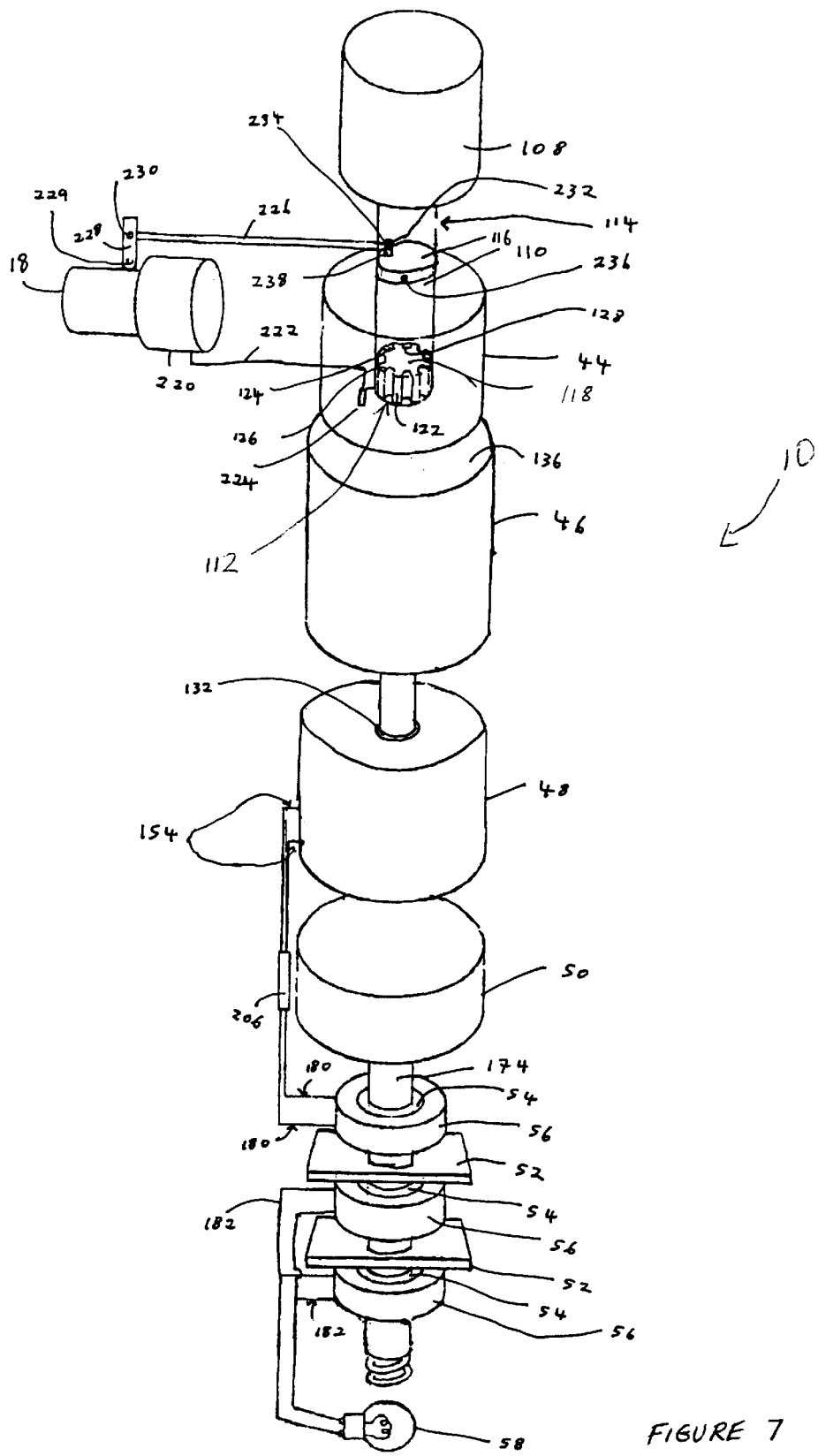
FIG. 7 is a perspective view of the working components of FIG. 2a with the inner and outer cylinders removed.

As shown in FIG. 7, a fuel reservoir 108 is provided. Fuel reservoir may be of any size which is sufficient to render flashlight 10 portable. For example, fuel reservoir 108 may comprise a storage tank having a volume from about 25 ml to 1 litre or more. One litre of fuel weighs about the equivalent of about 6 D cell batteries. Commercially available flashlights typically use up to 8 such batteries. The total weight of a portable long life flashlight may be from about 300 g (for a unit with about 25–50 ml of fuel and a life of about 100 hours) to about 2 kg (for a unit with about 1 litre of fuel and a life of about 2000 hours). Conduit 110 extends from reservoir 108 to annular burner 112. Conduit 110 extends through shield 68, 78 and 72 and has openings 114 through which fresh air for combustion may be drawn, via preheat air flow path 102, for mixing with the fuel prior to combustion in burner 112. A valve 116 is provided in conduit 110 so as to selectively connect reservoir 108 and burner 112 in fluid flow communication when it is desired to power flashlight 10. In an alternate embodiment, the heat engine may be connected to an external fuel source via conduit 110 and the fuel flow control valve may be provided as part of the external fuel source (eg. a regulator on a fuel tank).

Burner

Burner 112 may be of any type known in the art. Preferably, burner 112 has a top 118 a bottom 120 and a circumferential sidewall having a plurality of recesses 124 provided therein through which the mixture of air and fuel may pass and be combusted (see FIGS. 3 and 7). Each recess 124 is defined by a pair of opposed radial walls 126 and an inner circumferential wall 128. The air fuel mixture may be ignited by a piezo electric member positioned in housing 220 in which button 18 is mounted and an electric spark may be transmitted to a position adjacent burner 112 by means of wire 222 and spark plug 224. Buttons to open fuel valves, and to hold them open, are known in the art and any such device may be incorporated into this design.

In operation, when button 18 is depressed into housing 220, drive rod 228 (which is affixed to button 18 by eg. screw 229) causes connecting rod 226 (which is pivotally mounted to drive rod 228 by pivot 230) to move laterally transmitting this lateral force to valve 116 via drive rod 232 (which is pivotally connected to connecting rod 226 by pivot 234 and to valve 116 by pivot 238) causing valve 116 to pivot about pivot 236 to the open position. This allows pressurized fuel to pass through conduit 110 drawing air for combustion through openings 114 into conduit 110. The mixed fuel and air passes through burner 112 where it is ignited by any means known in the art such as spark plug 224. The combustion of the fuel produces heated exhaust gases which pass through heater cup 44. In the embodiment of FIG. 3, the exhaust gases exit flashlight 10 by means of first manifold 94, first pass 86, second pass 88, second manifold 98 and exit port 100. Button 18 may be locked in this "on position" by a locking means in housing 220. Alternately, the fuel valve may be controlled by a thermomechanical member, an electrothermomechanical member or electric control.

Displacer Control

Figure 10:
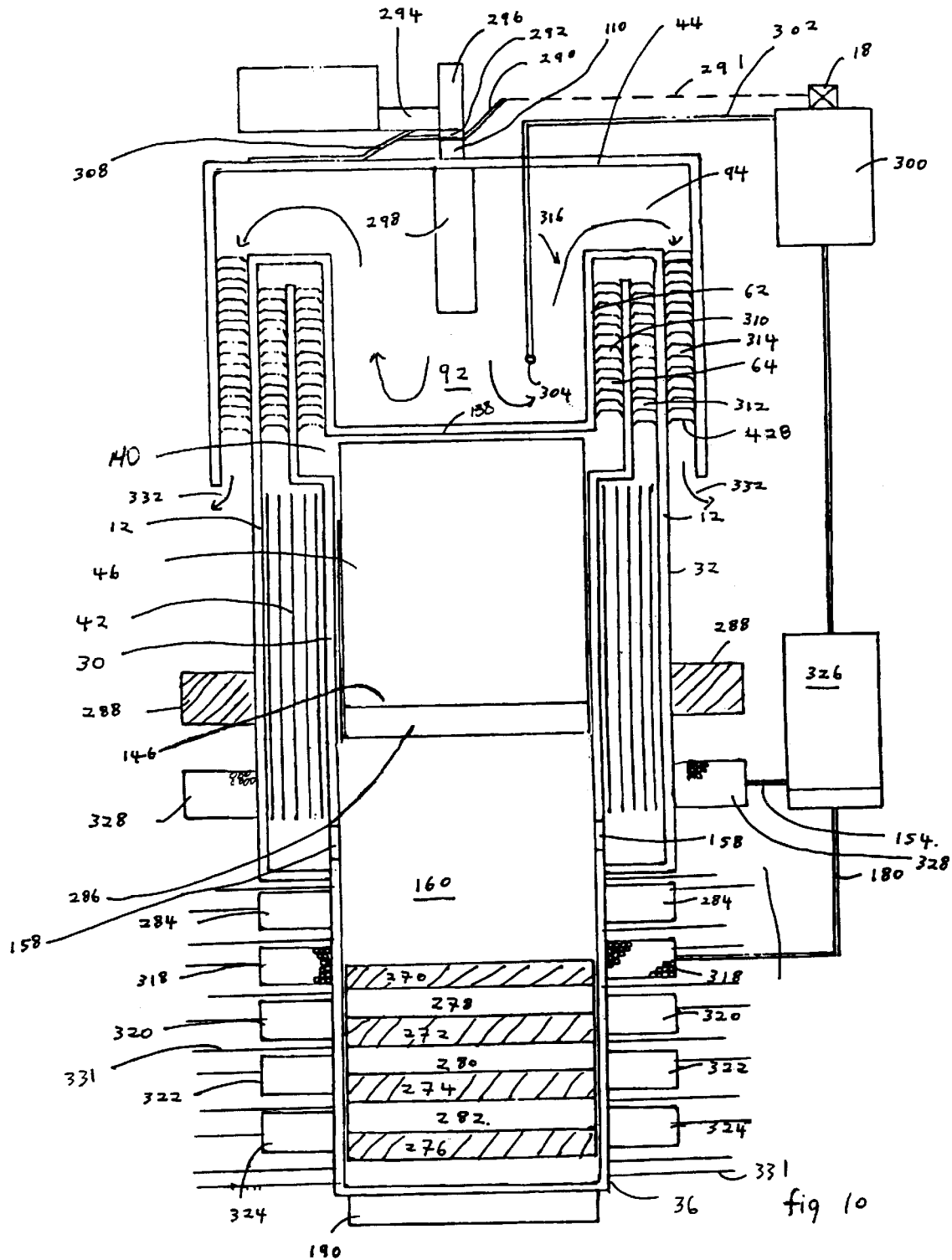
FIG. 10 is a cross section along the line 10—10 of FIG. 9 with the heat exchanger for the fresh air for combustion removed, with the displacer positioned adjacent the heater cup and the power piston positioned at the end of the power stroke.

According to another aspect of the instant invention, the upstroke and downstroke of the displacer are different. Preferably, the heat engine includes means for operating displacer 46 and piston 50 to provide the working fluid with greater residence time in cooling chamber 140 than in heating chamber 160. This may be accomplished by controlling displacer 46 so that upstroke and the downstroke portions of the displacer cycle vary, e.g., by varying the rate of movement of displacer 46 during the upstroke as compared to the downstroke or by pausing displacer 46 during its cycle to provide the additional residence time in cooling chamber 140. Such movement of displacer 46 provides improved thermodynamically efficient heat transfer to and from the working fluid. By allowing an additional 40%, preferably 30% and more preferably 20% of time for the air in the cold region, improved thermodynamic efficiency can be achieved. Exemplary means for operating the displacer include the use of a solenoid or a magnetic drive system. This may be achieved by attenuating the pulse width and phase delay of the signal sent to the driver by means of a phase delay circuit 326 (see, eg. FIG. 10).

For example, referring to FIGS. 24*a* and *b*, the displacement of displacer 46 and piston 50 from the central positions of their cycle is plotted against time. In FIG. 24*a*, the phase angle between displacer 46 and piston 50 is 180° and the rate of expansion and the rate of compression by each of displacer 46 and piston 50 are the same. Traditionally in heat engines, the movement of the displacer 46 and piston 50 are physically linked together by a mechanical coupling and can not be varied. According to one aspect of the instant invention, the phase angle between displacer 46 and piston 50 may be varied. In addition, the rate of expansion and the rate of compression of one, and preferably both, of displacer 46 and piston 50 may be varied. The compression and expansion of the working fluid, and the phase angle between displacer 46 and piston 50, may be varied to optimize the cooling capacity of a heat engine under different thermal loads and different thermal conditions. By way of example, in FIG. 24*b*, the phase angle between displacer 46 and piston 50 is 180° but the rate of expansion and the rate of compression by piston 50 are different. In this example, rapid compression is followed by a slower rate of compression then by a rapid rate of expansion followed by a slower rate of expansion. The expansion and compression rates are independent and are each individually adjusted to maximize heat transfer between the working fluid and the heat engine. The actual cycle profile will vary for different configurations of the heat engine. An advantage of the instant invention is that the electronic control of piston 50 permits the cycle profile to be easily adjusted to meet different configurations of the heat engine as well as different uses of the heat engine (eg. electricity production, refrigeration, cryocooling). In this way, the compression and expansion of the working fluid may be controlled to be conducted at thermodynamically optimum rates and the heat engine may be used not only to generate work using a heat source but to generate cooling using work input to a linear generator operating as a piston.

Referring to FIGS. 2*a*–2*d*, the heat engine has a first portion 240 in which displacer 46 is movably mounted and a second portion 242 in which power piston 50 is movably mounted. The portion within which displacer 46 is movable is the hot end of the heat engine and the portion within which the power piston is movable is the cool end of the heat engine. Driver 48 has an internal circumferential wall 130 defining an opening 132 into which displacer rod 134 is received. Displacer 46 is mounted for movement within inner wall 30 between the alpha position shown in FIG. 2*b* wherein displacer 46 is withdrawn from heater cup 44 and the omega position as shown in FIG. 2*a* in which displacer 46 is distal to driver 48 and advanced towards heater cup 44. As shown in FIGS. 2*a* and 2*c*, when displacer 46 is positioned in the omega position, there is a chamber 244 between displacer 46 and driver 48. In this position, displacer rod 134 is substantially removed from opening 132. As shown in FIGS. 2*b* and 2*d*, when displacer 46 is in the alpha position, effectively all of displacer rod 134 is received in opening 132 leaving heating chamber 140 (defined by top 136 of displacer 46, bottom 138 of heater cup 44 and inner surface 38 of inner wall 30) between displacer 46 and heater cup 44.

Heating chamber 140 is heated by the combustion occurring in heater cup 44. As displacer 46 moves upwardly to the position shown in FIG. 2*a*, the heated working fluid in heating chamber 140 is forced upwardly through fluid flow path 64 where it is heated by the heated heater cup 44, and through opening 66 into fluid flow path 40 (a portion of the working fluid passageway) where it is heated by the exhaust gasses, thus increasing the pressure of the working gas. When displacer 46 is in the distal position shown in FIGS. 2*a* and 2*c*, effectively all of the working fluid has been forced out of heating chamber 140. To this end, it is preferred that bottom 138 of heater cup 44 and top 136 of displacer 46 are constructed so as to intimately fit adjacent each other so as to force as much of the working fluid out of the heating chamber 140 as possible. Preferably, as shown in FIG. 2*a*, bottom 138 is curved so as to transfer heat to the working fluid. Alternately, as shown in FIG. 3, bottom 138 may be flat and, accordingly, top 136 of displacer 46 may also be flat.

Inner circumferential wall 130 of driver 48 provides a guide for displacer rod 134 so as to maintain the longitudinal alignment of displacer 46 along axis A as displacer 46 moves between the alpha and omega positions. Displacer rod 134 and inner circumferential wall 130 may be dimensioned and constructed so as to allow relatively frictionless movement of displacer rod 134 into and out of opening 132. In order to further assist in the reduction of frictional forces, bottom 146 of displacer 46 may have a recessed circumferential wall 148. A teflon bushing 150 or the like may be mounted around recessed circumferential wall 148 for engagement with inner surface 38 of inner wall 30 as displacer 46 moves. Further, a second teflon bushing or the like 152 may be provided on inner circumferential wall 130.

Driver 48 may be any means known in the art which is drivingly connected to displacer 46 to cause displacer 46 to move in a cycle that is complementary to the cycle of power piston 50 so as to optimize the thermal efficiency of the heat engine. This may be achieved by moving displacer 46 in response to an external stimulus such as an electrical impulse caused by the movement of power piston 50. Preferably, driver 48 is a solenoid or an electromagnet and, more preferably, an electromagnet. If driver 48 is a solenoid, current may be provided to the solenoid by means of wire 154 (see FIG. 2*e*). Accordingly, when current is supplied to the solenoid, displacer 46 will move due the current (i.e. the external force) supplied thereto. If driver 48 is an electromagnet, then, displacer 46 and/or displacer rod 134 includes a permanent magnet for moving displacer 46 due to a magnetic field produced by the electromagnet. Accordingly, when current is supplied to the coils of the electromagnet, the coils may be charged in a reverse polarity to the portion of displacer rod 134 in opening 132 thus forcing displacer rod 134 outwardly from opening 132 thus driving the working fluid from heating chamber 140. When the current is reversed in the coils, displacer rod 134 is attracted to driver 48 and accordingly displacer rod 134 is pulled downwardly into opening 132 (thus drawing the working fluid into heating chamber 140).

In a preferred embodiment, displacer 46 is biased, preferably to the alpha position shown in FIG. 2b. This may be achieved, for example, by means of spring 156 as shown in FIGS. 2c and 3. In such a case, driver 48 may act only to move displacer 46 to the omega position (i.e. towards heater cup 44) thus pushing heated working fluid to cooling chamber 160. When the working fluid is cooled to a sufficient degree, the current to driver 48 may be switched off allowing the biasing means (eg. spring 156) to move the displacer to the alpha position thus drawing the working fluid into heating chamber 140. When the working fluid is heated, the current to driver 48 may be switched on thus moving displacer 46 against spring 156 to the omega position. In one embodiment, driver 48 may be powered at all times once the heat engine is running.

It will be appreciated that driver 48 need not completely extend to inner wall 38 of inner wall 30. For example, driver 48 may have a smaller diameter than inner wall 30 and be mounted thereto by, eg., brackets. If the outer wall of driver 48 contacts inner wall 38 as shown in FIGS. 2a–2e, then chamber 244 is preferably in fluid flow communication with cooling chamber 160, such as by passage 260, to prevent a reduced pressure region from forming in chamber 244. Thus, when displaced moves to the extended position shown in FIG. 2a, cooled working fluid in cooling chamber 160 may travel through passage 260 into chamber 244 to maintain an equilibrium pressure between chambers 244 and 160. Further, when displacer 46 moves to the retracted position as shown in FIG. 2b, cooled fluid is pushed from chamber 244 by displacer 46 into cooling chamber 160 via passage 260 and then to heating chamber 140.

Figure 5:
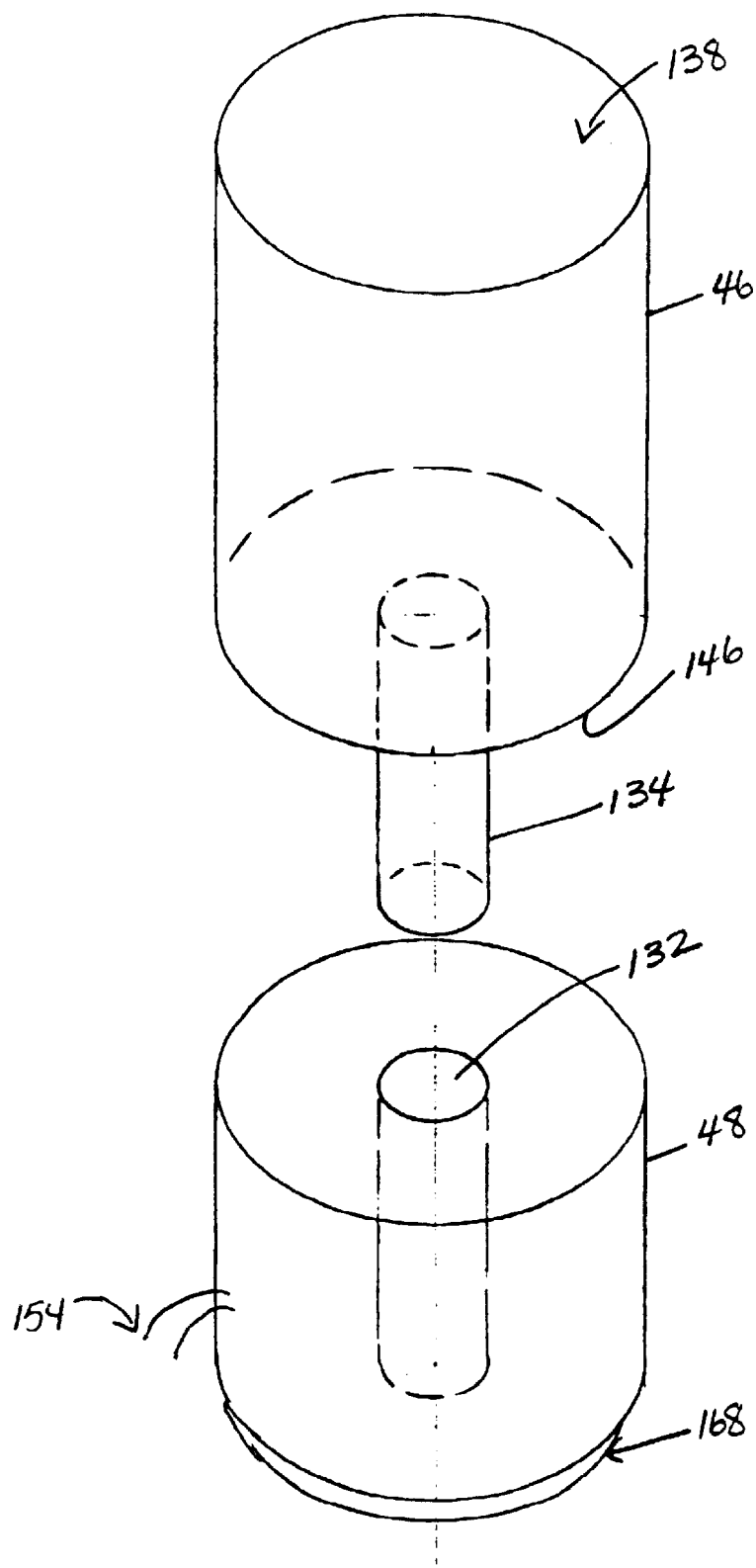
FIG. 5 is an exploded view of the displacer and electromagnet of FIG. 2.

Inner wall 30 is provided with a passageway, eg. a plurality of openings 158 adjacent the top of cooling zone 26. Openings 158 define an entry port for the working fluid to enter second portion 242 of the heat engine after passing through air flow path 40. As shown in FIG. 5, the lower portion of driver 48 may have a chamfered surface 168. The chamfered surface assists in directing the working fluid into and out of cooling chamber 160. Power piston 50 is not physically connected to displacer 46 but is moved due to the change of pressure in cooling chamber 160. Accordingly, when displacer rod 134 moves displacer 46 to the withdrawn position shown in FIGS. 2a and 2c, working fluid is forced through flow path 40, through opening 158 into cooling chamber 160. The action of the working fluid on top 162 of piston 50 forces piston 50 downwardly into open area 246. As the working fluid cools in cooling chamber 160, the pressure of the working fluid decreases thus drawing piston 50 upwardly and reducing the volume of the working zone of the heat engine (i.e. chambers 140, 160, 244 and fluid flow paths 64 and 40). When displacer 46 moves away from heater cup 44 to the position shown in FIGS. 2b and 2d, eg. in response to driver 48 or the spring, the working fluid is drawn from cooling chamber 160 through openings 158 through flow path 40 through openings 66, through flow path 64 into heating chamber 140.

In the alternate embodiment of FIGS. 9–11, 19 and 20, driver 48 comprises a magnetic field that is imposed on displacer 46. As exemplified in these Figures, displacer 46 has a magnet 286 affixed to it, preferably on bottom 146. Displacer magnet 286 and displacer 46 affixed thereto are held concentrically in place and their range of motion limited by two magnets 284 and 288 which are preferably circular and which repel the displacer magnet 286. Thus displacer 46 sits on a magnetic bearing caused by the mutual repulsion of magnet 288 to displacer magnet 286 and the mutual repulsion of magnet 284 to displacer magnet 286. The repulsive magnetic field between magnets 286 and 288 serves to store kinetic energy from the upstroke of displacer 46 and limits the travel of displacer 46. The stored kinetic energy from the upstroke of displacer 46 is returned to displacer 46 on the downstroke.

Linear Generator

In another aspect of the design, the apparatus includes a linear generator. Preferably, piston 50 comprises part of the linear generator. The linear generator in electrical generation zone 28 may be of any construction known in the art. The following description is of the preferred embodiment of the linear generator which is shown in FIGS. 2a, 2b, 2c, 2d and 4. In these embodiments, the linear generator is positioned in a sealed chamber. In the embodiment of FIGS. 2a and 2b, the upper end of the linear generator is isolated from the working fluid by piston 50 and the lower end is sealed by closure member 195. In the embodiments of FIGS. 2c, 2d and 4, the upper end of the linear generator is isolated from the working fluid by top 162 and the lower end is sealed by closure member 195. As shown in FIGS. 2a and 2b, piston 50 is a sealed member having a top 162, a bottom 170 and sidewalls 172. Drive rod 174 may accordingly be affixed to bottom 170 by any means known in the art. In the embodiment of FIGS. 2c, 2d and 4, piston 50 comprises top 162 and sidewalls 172. In this embodiment, drive rod 174 is affixed to inner surface 176 of top 162, by any means known in the art, such as by threaded engagement therewith. As shown in FIG. 4, inner surface 176 may be provided with a splined shaft 178 which is received in a mating recess in drive rod 174.

A plurality of magnets 52 are fixedly attached to drive rod 174 by any means known in the art, such as by use of an adhesive or by mechanical means (eg. the interior opening through which drive rod passes in magnet 152 may be sized to produce a locking fit with drive rod 174 or drive rod 174 may be threaded and magnet 152 may be positioned between spacers that are threadedly received on drive rod 174). A mating number of coils 56 of electrically conductive wire are provided at discrete locations along the length of electrical generation zone 28. Coils 56 are affixed to inner wall 34 of outer wall 12 by any means known in the art, such as by means of an adhesive or by mechanical means (eg. coils 56 may be provided in a housing which is affixed to inner wall 34 by welding or by brackets). Thus coils 56 are stationary as drive rod with magnets 52 affixed thereto is moved by power piston 50. It will be appreciated that coils 56 may be affixed in a stationary manner by any other means known in the art. In an alternate embodiment, coils 56 may be affixed to drive rod 174 and magnets 52 may be stationary.

An annular ferrite bead 54 is positioned centrally within each set of coils 56. Each ferrite bead 54 has a central opening through which drive rod 174 passes. One of the coils 56 has wires 180 extending outwardly therefrom. The remainder of the coils 56 have wires 182 extending outwardly therefrom (see FIG. 7). It will be appreciated by those skilled in the art that only one ferrite bead 54 and one coil 156 may be provided. It will further be appreciated that the output wires from any of the coils 56 may be grouped together in parallel or series as may be desired.

As power piston 50 moves into area 246 away from driver 48 in response to working fluid impinging upon top 162, magnets 52 move longitudinally along axis A so as to cause current to flow in coils 56 (see FIG. 2b). When piston 50 moves upwardly due to the cooling of the working fluid in cooling chamber 160, magnets 52 are then driven in the reverse direction causing current to again flow in coils 56.

In the preferred embodiment, each magnet 152 moves between a pair of ferrites 154. In particular, referring to FIG. 4, magnet 52a is movably mounted in the linear generator between ferrite 54a and ferrite 54b. As drive rod 174 moves with piston 50, magnet 52a moves from a position adjacent ferrite 54a as shown in FIG. 4 to a position adjacent ferrite 54b. Similarly, magnet 52b moves from a position adjacent ferrite 54b to a position adjacent ferrite 54c. In this way, it will be seen that at the end of each stroke of piston 50, ferrite 54b is acted upon at any one time by only one magnet 152. Similarly, magnet 52a will first act upon ferrite 54a and then upon ferrite 54b. In this way, ferrite 54b is sequentially exposed to, eg., a north field from magnet 52a and then a south field from magnet 52b.

One advantage of the instant design is that there is a higher rate of change of flux per unit time due to ferrites 154 first being acted upon by one field and then the opposed field. Further, since ferrite 154 is acted upon by opposed poles of different magnets, the magnetic field induced on ferrite on 54b by magnet 52a will completely collapse as magnet 52a moves to the position shown in FIG. 4 and ferrite 54b is acted upon by magnet 52b.

An alternate construction of a linear generator is shown in FIGS. 9–11, 19 and 20. In these embodiments, the magnets are positioned within inner wall 30 and the coils are positioned exterior thereto (eg. on outer surface 36 of inner wall 30 or on outer surface 32 of outer wall 12). Power piston 50 consists of a plurality of spaced apart magnets, eg. four magnets 270, 272, 274 and 276 and three non-magnetic spacers 278, 280 and 282. The non-magnetic spacers may be made of plastic which surrounds and encases the magnets. It will be appreciated that the assembly of magnets and spacers may be connected to the power piston of FIG. 2a or 2c by a drive rod 174. Preferably, the assembly comprises piston 50.

Power piston 50 of FIGS. 9–11, 19 and 20 is held concentrically in place and its range of motion limited by two magnets 284 and 190 which are preferably circular permanent magnets and which repel magnets 270 and 276 respectively. Thus the power piston 50 sits on a magnetic bearing caused by the mutual repulsion of magnets 284 and 270, and magnets 190 and 276. The repulsive magnetic field between magnets 276 and 190 serves to store kinetic energy from the downstroke of the power piston 50 and will return this energy to the power piston 50 on the upstroke of power piston 50. Thus the magnets 276 and 190 act as a magnetic spring at the bottom of the stroke, and, similarly, magnets 284 and 270 form a repulsive magnetic field at the top of the power piston stroke which also acts as a magnetic spring.

Heat Engine Cycle

Figure 9:
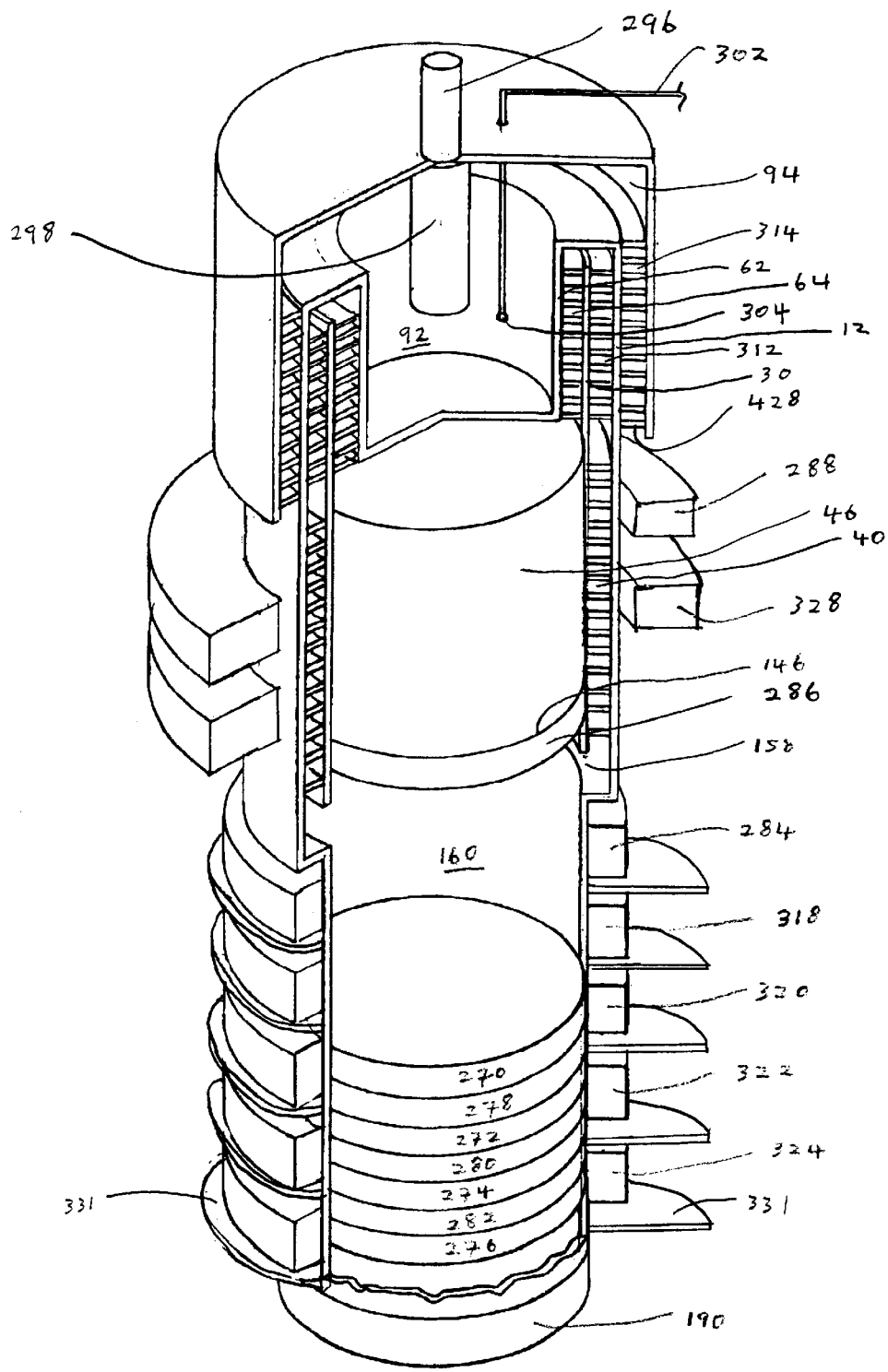
FIG. 9 is a partially cut away perspective view of a heat engine according to a second embodiment of the instant invention which employs a magnetic drive system wherein the electronic control shown in FIGS. 9 and 10 has been removed.
Figure 11:
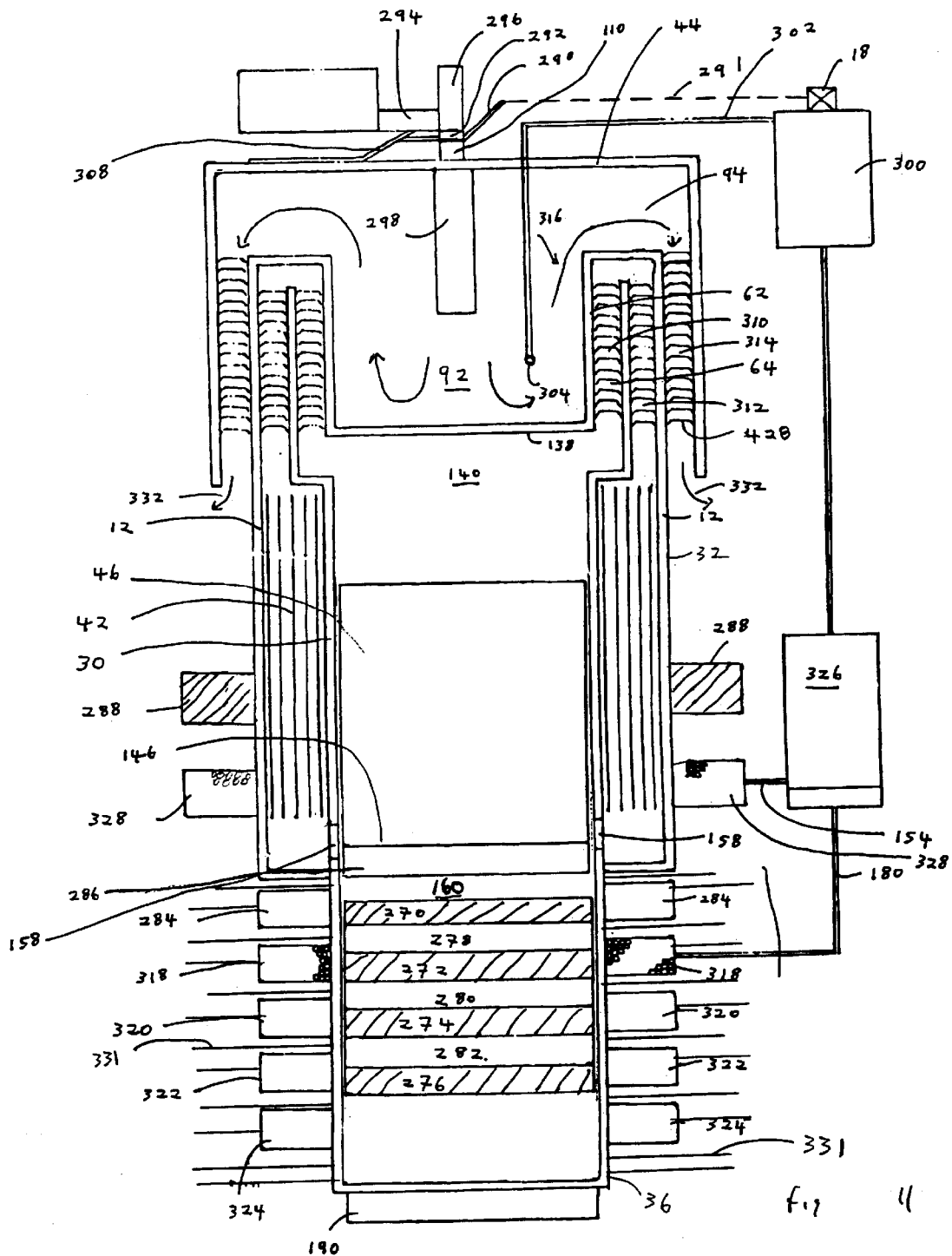
FIG. 11 is a cross section along the line 10—10 of FIG. 9 with the heat exchanger for the fresh air for combustion removed, with the displacer positioned distal to the heater cup and the power piston positioned at the beginning of the power stroke.

The following is a description of the operation of the heat engine based on the embodiment of FIGS. 9–11 wherein fin means are provided in various fluid flow passageways to assist in heat transfer. Heating chamber 140, cooling chamber 160 and passageways 64, 312 and 40 are a sealed region within which the working fluid circulates. This heat engine cycle begins with displacer 46 positioned towards the cold end of the engine, that is, in the alpha position. This causes most of the working fluid to be forced into heating chamber 140. Wall 62 of burner cup 44 heats the inner heat exchanger 310 which in turn heats the working fluid in passage 64. The hot exhaust gas 316 then pass through manifold 94 and then pass through the exhaust outer heat exchanger 314 (to which the hot exhaust gas imparts most of its heat energy) and exit as cooled exhaust gas 332. The heat energy from the exhaust outer heat exchanger 314 is then transferred through the heat engine outer wall 12 and into the exhaust inner heat exchanger 312 which in turn imparts this heat into the working fluid.

The heating of the working fluid causes the working fluid to expand. The expansion takes place through heat exchangers 310 and 312, through the regenerator 42, through openings 158 and into cooling chamber 160 where pressure begins to build against power piston 50. This causes power piston 50 to move downwards towards magnet 190 and causes the magnets 270, 272, 274 and 276 to induce voltages and current in the generator coils 318, 320, 322 and 324 respectively.

The electrical energy from one or more of the coils, eg. generator coil 318, provides power via wires 180 to the phase delay circuit 326 which modifies the power signal from the generator coil 318 and then feeds it through wires 154 to the displacer control coil 328. Circuit 326 may comprise, eg., either of a variable capacitor and a fixed inductor or of a variable inductor and a fixed capacitor. Phase delay circuit 326 may be any circuit that will drive displacer 46 to move in a cycle that is out of phase to the cycle of power piston 50. Circuit 326 modifies the power signal from the generator coil 318 and then feeds it through wire 154 to displacer control coil 328. This signal sent to the displacer control coil 328 causes an upward force on the magnet 286 which in turn causes magnet 286 and displacer 46 affixed thereto to move upwards towards magnet 288.

The upstroke of displacer 46 causes the working fluid to flow through the heat exchangers 312 and 310, through the regenerator 42, through the openings 158 and into the cold end of the engine 160. As the working fluid passes through the regenerator 42, most of the heat of the working fluid is transferred to the regenerator 42. The remaining heat from the working fluid now located in the cold end 160 of the engine is dissipated by heat exchanger 330. Heat from the working fluid now located in cooling chamber 160 is dissipated by heat exchanger 330 which preferably comprises a plurality of cooling fins 331 which may be louvred fins 428, 440, 468 or helical louvred fin 448. This causes the working fluid to contract and reduces the pressure within the engine. This causes power piston 50 to move upwards under the influence of the magnetic energy stored between magnets 276 and 190.

The upward motion of power piston 50 causes magnet 270 to induce a reverse current pulse in the generator coil 318. This reverse current pulse from generator coil 318 provides power to the phase delay circuit 326 which modifies the power signal from the generator coil 318 and then feeds it through wires 154 to the displacer control coil 328. This signal sent to the displacer control coil 328 causes a downward force on displacer magnet 286 which in turn causes displacer magnet 286 and displacer 46 affixed thereto to move downwards towards magnet 284. The repulsive magnetic field between displacer magnet 286 and magnet 288 serves to impart the stored kinetic energy from the upstroke of the displacer 46 to the downstroke. The repulsive magnetic field between displacer magnet 286 and magnet 284 serves to store kinetic energy from the downstroke of displacer 46 for the next upstroke. The repulsion of displacer magnet 286 and magnet 284 also serves to limit the travel of displacer 46.

In an alternate embodiment, phase delay circuit 326 may be replaced by a controller that senses when the voltage from the generator coil 318 is approaching zero which is the bottom of the stroke of the power piston 50. At this point, the controller may cut the signal to the displacer control coil 328 and begin a reverse (negative) pulse which causes the displacer 46 to move downwards towards magnet 270. Alternately, the controller may cut the signal and allow displacer 46 to move downwardly under the influence of a biasing member, eg. a spring or the magnetic fields to which it is exposed.

If displacer is to be directly driven by piston 50 (eg. without any phase angle modification) electrical energy from generator coil 318 may provide power via wires 180 to displacer control coil 328.

The downward movement of the displacer 46 causes the working fluid to be forced from the cold end of the engine 160 through openings 158, through regenerator 42 through the heat exchangers 312 and 310, and into the hot end of the engine near bottom 138 of burner cup 44. As the working fluid passes through regenerator 42, most of the heat stored in regenerator 42 is transferred into the working fluid. The cycle then repeats itself.

Self Starting

Piston 50 is preferably biased to the alpha position shown in FIGS. 2b, 2c and 4 such as by means of a spring 184 (see FIG. 2b) or by a magnetic bushing (eg. 186, 190) as shown in FIGS. 2c and 4. In particular, as shown in FIG. 4, a magnet 186 is attached to distal end 188 of drive rod 174 from piston 50. Distal end 188 travels through an central opening in closure member 195 which may be installed in outer wall 12 by a press fit. A second magnet 190 is affixed to inner surface 192 of closure member 194. To prevent the magnets touching each other, an elastomeric member 196 may be affixed to the distal end of magnet 190 from inner surface 192. End 198 of magnet 186 is of an opposite polarity to end 200 of magnet 190. Accordingly, magnets 190 and 186 will repel piston 50 to the alpha position shown in FIG. 4. Piston 50 moves between the alpha position and the omega position (shown in FIG. 2d) due to the influence of the working fluid on top 162 of piston 50.

By biasing displacer 46 and piston 50 to the alpha positions, the heat engine may be self starting. In particular, when heat is applied to heating chamber 92 (eg. combustion is initiated in heater cup 44), the working fluid in heating chamber 140 will commence expanding. The expansion of the working fluid will cause some of the working fluid to pass out of heating chamber 140 into cooling chamber 160. The entrance of the working fluid into cooling chamber 160 will cause piston 50 to move downwardly. Provided piston 50 moves downwardly by a sufficient amount and/or at a sufficient rate, an electrical current will be generated which may be transmitted by wires 180 to driver 48. The signal will cause driver 48 to move displacer 46 towards the omega position thus initiating a first stroke of displacer 46 and evacuating additional heated working fluid from heating chamber 140 into cooling chamber 160 thus further driving piston 50 downwardly to generate further amounts of current.

The working fluid is isolated in the heat engine. To this end, the opposed ends of inner wall 30 are sealed and fluid flow path 40 is also sealed. Heater cup 44 is preferably used to seal the end of inner wall 30 adjacent heating chamber 140. Piston 50 is preferably used to seal the end of inner wall 30 adjacent cooling chamber 160 such as by creating a seal with inner surface 38 of inner wall 30 thus isolating the linear generator from the working fluid.

It will be appreciated that the linear generator need not be sealed. For example, air may be able to pass through the central opening in closure member 195 as well as past coils 56 so as to prevent significant pressure build up in the linear generator as magnets 52 move.

Closure members 194 and 195 assist in the construction of flashlight 10 as well as to protect coils 56 from the incursion of foreign material which would damage the linear generator. Closure members 194 and 195 may be affixed to the bottom of the one of the cylinders by any means known in the art. For example, referring to FIG. 2a, closure member 195 is integrally formed as part of outer wall 30 whereas, for example, closure member 194 is welded to the distal end of outer wall 12 from heater cup 44. In the embodiment shown in FIG. 4, closure member 194 has an annular flange 202 which is threadedly received on outer surface 32 of outer wall 12. However, if the inner container, or the outer container, are prepared by high speed die stamping, then closure members may be integrally formed as part of the inner/outer container.

Figure 8:
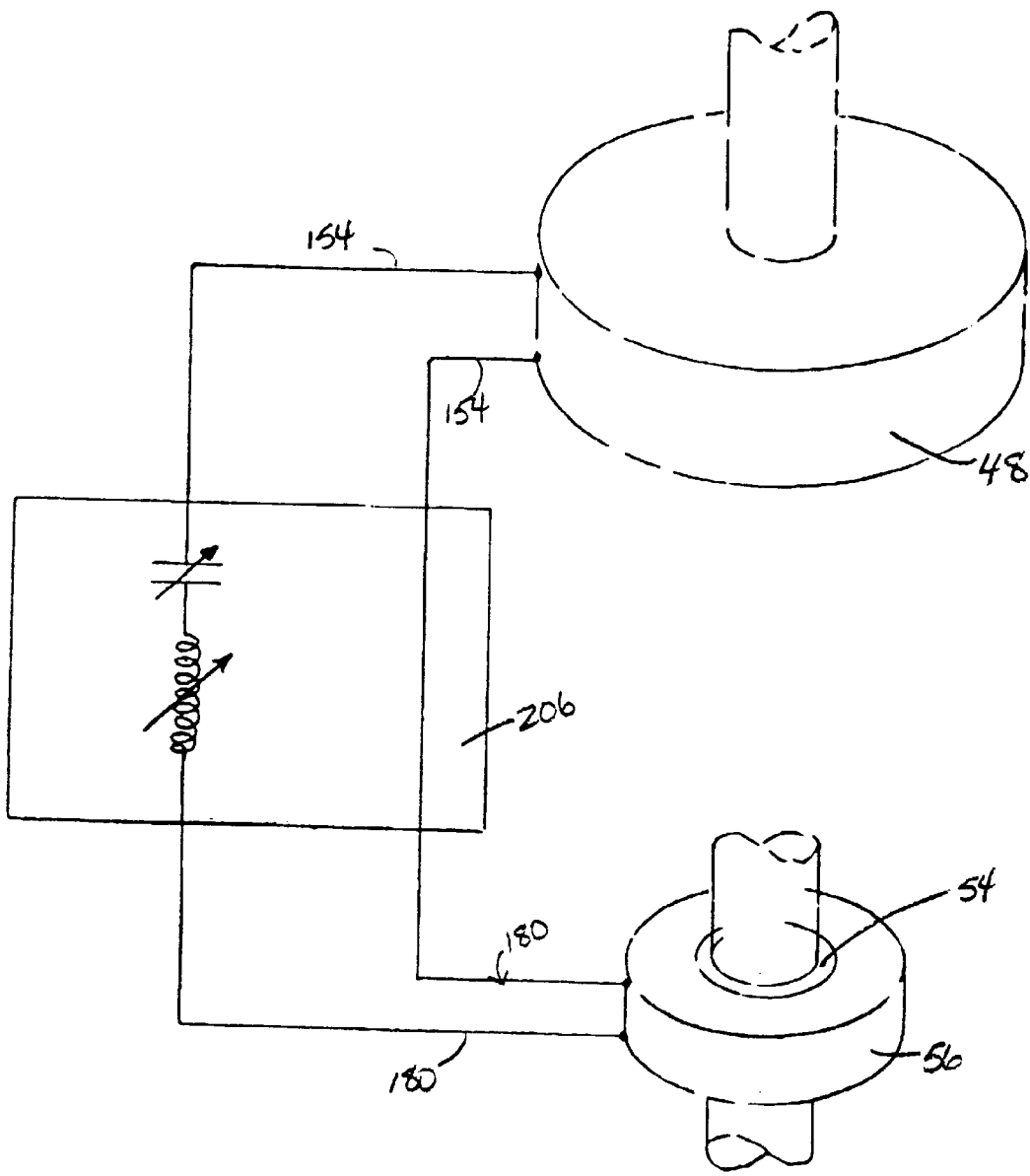
FIG. 8 is a schematic drawing of the control circuit for the electromagnet of FIG. 5.

Referring to FIG. 8, wires 180 from the first set of coils 56 are electrically connected to wires 154 of driver 48. Wires 180 pass through controller 206 (which is preferably phase delay circuit 326). Wires 180 and 154 as well as controller 206 (which may be a phase delay circuit) may be positioned between inner and outer walls 30 and 12 (i.e. in gaps 166 and fluid flow path 40).

Thermomechanical Control

A cross sectional view of a preferred embodiment of a heat exchanger utilizing thermomechanical control is shown in FIGS. 9–11.

To start the engine, the start switch 18 is engaged. The start switch 18 is operatively linked to the fuel switch lever 290 by means of linking member 291 which is preferably mechanical. Fuel switch lever 290 is activated such that the fuel flow control valve 292 and the variable flow fuel control valve 294 are both momentarily opened. Preferably fuel switch lever 290 is a mechanical switch drivenly moveable by linking member 291 between two positions and which is mechanically linked to fuel flow control valve 292 and the variable flow fuel control valve 294. When the lever switch 290 is released, the variable flow fuel control valve 294 closes and the fuel flow control valve 292 remains open. This ensures starting fuel reserve 296 is full and fuel from the starting fuel reserve 296 begins to flow. The fuel in the starting fuel reserve is sufficient for a short period of operation (eg. 1–2 minutes). In the event that the burner 298 fails to ignite, then the amount of fuel which may accidentally escape into the environment is limited to the small harmless amount in the starting fuel reserve 296. Hence the starting fuel reserve 296 and its associated mechanisms acts as a safety device to prevent the spillage or release of large quantities of fuel.

When start switch 18 is depressed, piezo crystal high voltage power supply 300 produces high voltage which flows along conductor 302 to the electrode 304 where a spark is created which ignites the fuel in the burner 298 and causes a flame to form. Optionally, the fuel switch lever 290 and the start switch 18 need not be linked together but may be sequentially operated by the user.

The flame immediately begins to heat burner cup 44 as well as heating fuel flow control member 308 which, on heating, begins to open the variable flow fuel control valve 294. Flow control valve member 308 may be any member that will reconfigure itself on heating so as to adjust the position of variable flow fuel control valve 294. Examples of such members include members that deform on heating (eg. a bimetal strip), significantly contract or elongate with temperature changes (eg. muscle wire) or significantly alter their spring constant with temperature changes thereby exerting variable force based on temperature (eg. homeostat type devices).

Fuel flow control member 308 is configured such that as the temperature in combustion chamber 92 reaches the optimum operating temperature, the variable flow fuel control valve 294 will be fully open so that the heat engine will provide full power. If full power is not required, the burner cup will begin to overheat because the available thermodynamic energy is not being converted to mechanical or electrical energy. The overheating will cause the variable flow fuel control valve 294 to begin to close over its central maximum flow point thereby reducing the fuel flow and thereby reducing the temperature to the optimal range. Thus a self regulating system is established wherein the amount of fuel delivered by the variable flow fuel control valve 294 is controlled by the temperature of combustion chamber 92 which always remains within its optimum operating range as controlled by the bimetal fuel flow control member 308.

Thermoelectromechanical Control

Figure 19:
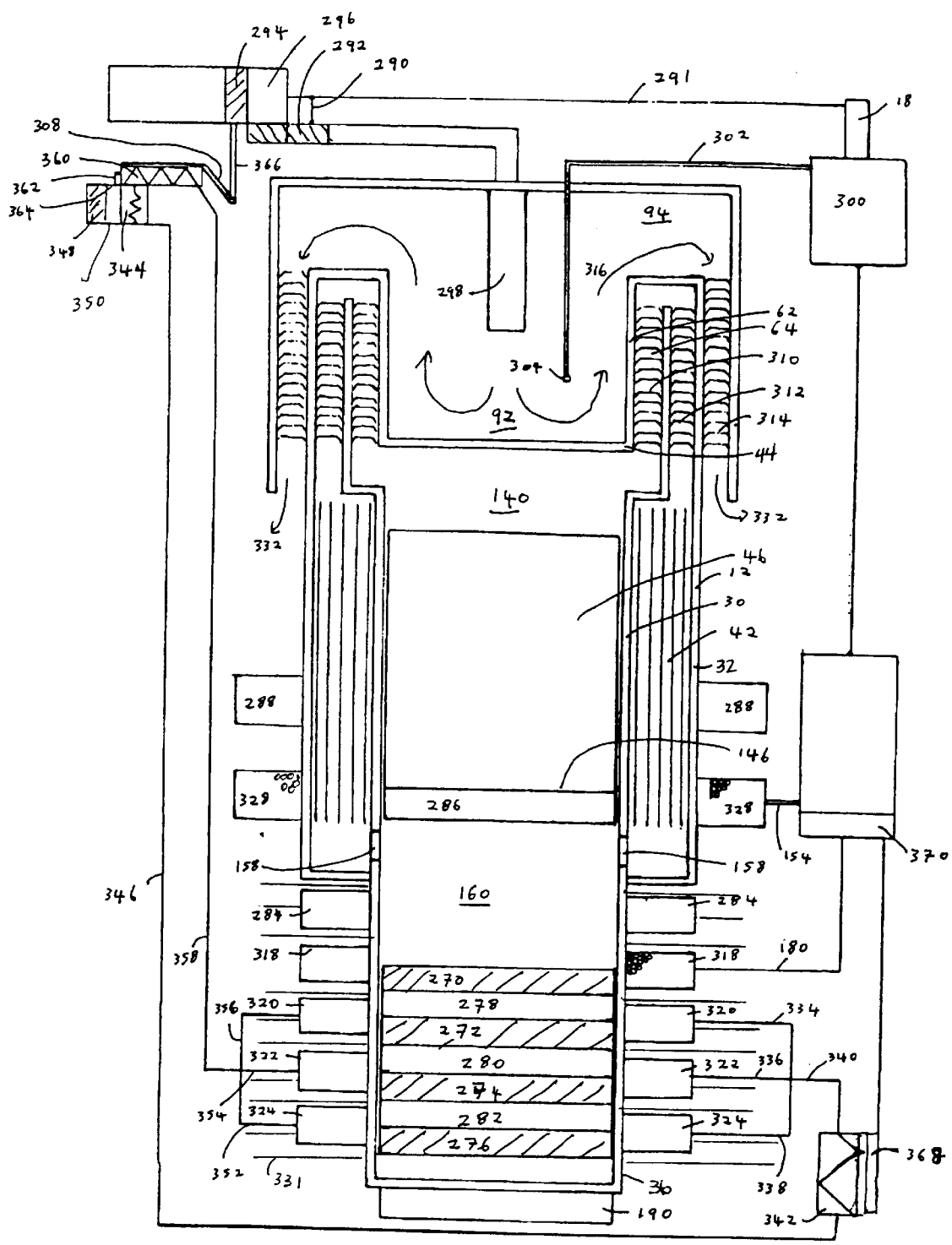
FIG. 19 is a cross section along the line 11—11 of FIG. 11a of a further alternate embodiment of the heat engine.

A cross sectional view of the preferred embodiment of this invention is shown in FIG. 19.

To start the engine, the start switch 18 is preferably engaged as with the embodiment of FIGS. 9–11 to commence ignition and the heating of heater cup 44. When the power piston 50 begins to move and the generator coils 318, 320, 322 and 324 begin to generate power, electricity flows through wires 334, 336 and 338 which are electrically connected to low resistance resistor 342 via wire 340. Electricity flows from low resistance resistor 342 to internal load resistor 344 via wire 346 and to external load 348 via wire 350.

Electricity from the generator coils 320, 322 and 324 also flows through wires 352, 354 and 356, through wire 358, through the low resistance resistor 360, through wires 362 and 364 to the internal load resistor 344 and to the external load 348. The internal load resistor 344 ensures that a small amount of current is always being withdrawn from the generator. This ensures that a small amount of current is always flowing through the low resistance resistor 360 which supplies heat to fuel flow control member 308 which opens the variable flow fuel control valve 294 by means of lever 366. The current drawn by the internal load resistor causes the low resistance resistor 360 to heat slightly which causes the fuel flow control member 308 to be reconfigured (eg. to bend or contract or deform) thereby opening the variable flow fuel control valve 294 enough to maintain the fuel flow required for standby operation.

When the current drawn by the external load 348 increases, the amount of heat created by the low resistance resistor 360 increases which causes the fuel flow control member 308 to be further configured (eg. to bend further) thereby opening the variable flow fuel control valve 294 further so as to provide enough fuel to provide the thermal energy required to generate the power drawn by the load. Thus a fuel control system which proportions the fuel flow to the load has been developed.

Upon ignition, the flame immediately begins to heat the burner cup 44. As the temperature of burner cup 44 becomes sufficient to cause the cyclic operation of the heat engine, the electrical current produced by generator coils 318, 320, 322 and 324 begins to flow. As the current begins to flow through low resistance resistor 360, through interal load resistor 344 via wire 346, low resistance resistor 360 begins to heat and supplies heat to fuel flow control member 308 which begins to open the variable flow fuel control valve 294 by means of lever 366. As the temperature of low resistance resistor 360 reaches its optimum operating temperature, the variable flow fuel control valve 294 will be open fully for full power. If full power is not required, the low resistance resistor 360 will become cooler thereby causing the variable flow fuel control valve 294 to begin to close thereby reducing the fuel flow. Conversely, if the load 348 draws more power, variable fuel flow control valve 294 will again be opened due to the increased heat of low resistance resistor 360 being supplied to the fuel flow control member 308 which in turn opens variable fuel flow control valve 294. Thus a self regulating system is established wherein the amount of fuel delivered by the variable flow fuel control valve 294 is controlled by the temperature of low resistance resistor 360 whose temperature is proportional to the power required by load 348. Alternately, if the system does not include internal load resistor 344, and if the external load 348 requires no power, then the mechanism associated with low resistance resistor 360 will cause variable fuel flow control valve 294 to shut off the fuel supply and cause the engine to stop once fuel reservoir 296 is exhausted.

The internal load resistor 344 ensures that a small amount of current is always being withdrawn from the generator. This ensures that a small amount of current is always flowing through the low resistance resistor 360 which supplies heat to the heat reconfigurable member 368 which operates the variable inductor 370. Heat reconfigurable member 368 may be any member that will reconfigure itself on heating (eg. a bimetal strip, muscle wire or homeostat type devices). The current drawn by internal load resistor 344 causes the low resistance resistor 360 to heat slightly which causes the heat reconfigurable member 368 to bend thereby operating the variable inductor 370 so as to maintain an optimal phase angle between the displacer 46 and the power piston 50. When the current drawn by the external load 348 increases, the amount of heat created by the low resistance resistor 360 increases which causes the heat reconfigurable member 368 to deform further thereby further changing the setting of the variable inductor 370 thereby again changing the phase angle relationship between the displacer 46 and the power piston 50. It has been found that a given engine with a given displacer and power piston phase angle relationship has an energy efficiency curve which varies for different power levels or different burner/ambient temperatures. Similarly, it has been found that by varying the phase angle, relationship between the displacer and the power piston, an efficient operating point can be established for any power and/or burner/ambient temperatures. Thus a simple displacer/power piston phase control system has been developed which modifies the phase angle under varying load conditions to maintain the efficiency of the system.

In an alternate embodiment, solid state electronics may be used to control a transistor which drives resistor 360 and fuel flow control member 308 of the variable fuel flow valve 294 and the variable inductor 370.

Electric Modulation Control

Figure 20:
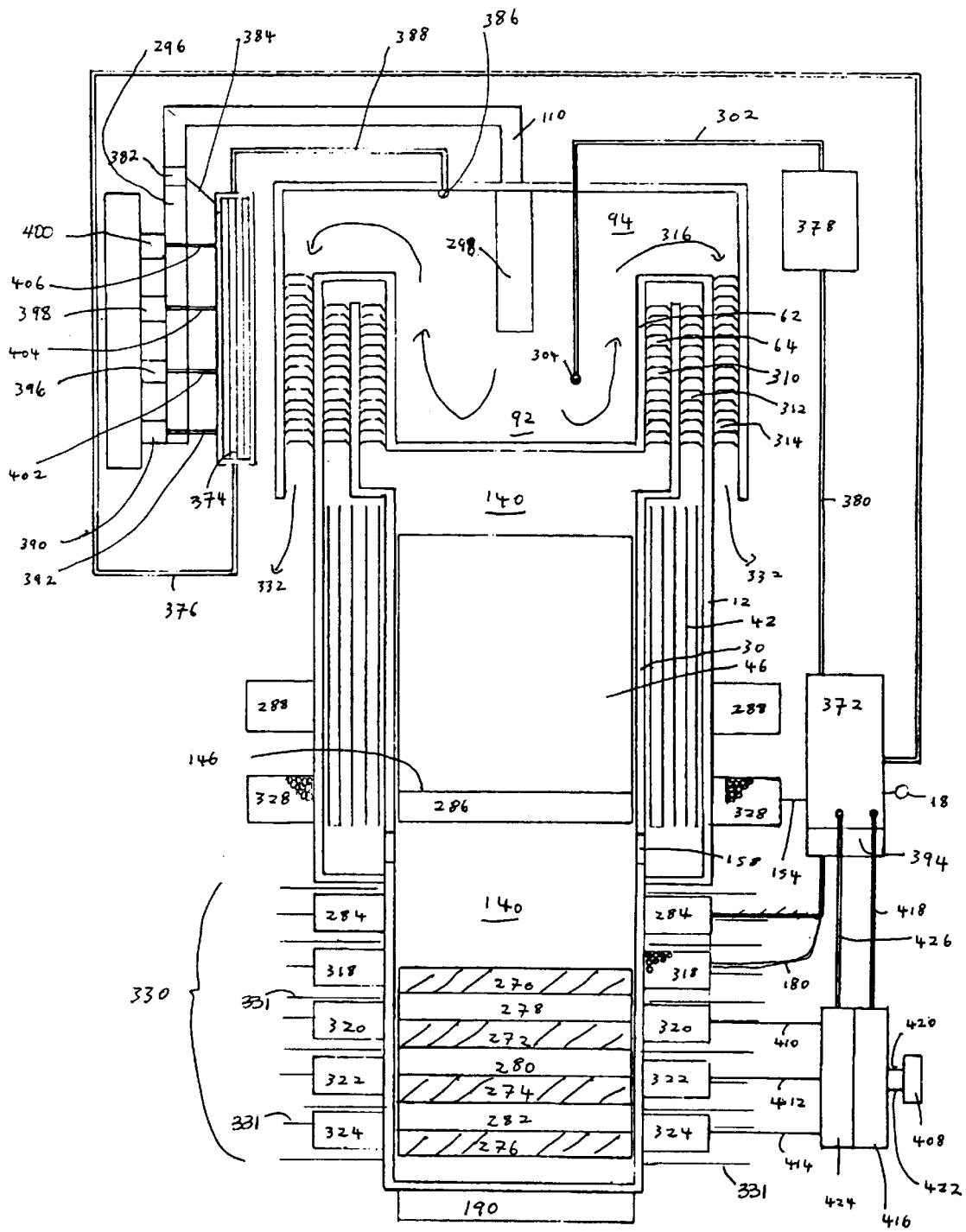
FIG. 20 is a cross section along the line 11—11 of FIG. 11a of a further alternate embodiment of the heat engine.

A cross sectional view of the preferred embodiment of this invention is shown in FIG. 20.

When the start switch 18 is depressed, a signal is sent from the primary controller 372 to the fuel flow controller 374 by means of wire bundle 376. The signal to the fuel flow controller 374 causes the fuel flow controller 374 to energize a valve, eg. spring loaded normally closed solenoid fuel valve 382, to open by means of wire pair 384. The opening of the spring loaded normally closed solenoid fuel valve 382 allows fuel to flow from the small staring fuel reservoir 296 along passage 110 and along to the burner 298.

The primary controller 372 also supplies power to the high voltage power supply 378 by means of the wire pair 380 which causes high voltage to be generated which then passes along wire 302 to the high voltage electrode 304 where sparks are created which causes the vaporized fuel in the burner 298 to be ignited. The resulting flame immediately begins to heat the bottom of the burner cup 44.

The hot exhaust gasses and radiation from the flame heats the temperature sensing means 386 (eg. a thermocouple) which is connected to the fuel flow controller 374 by means of the wire pair 388. In response to the fuel flow controller 374 interpreting a high temperature present, the fuel flow controller 374 energizes another valve, eg. spring loaded normally closed solenoid fuel valve 390, by means of wire pair 392. The fuel flow controller 374 also sends a signal to the primary controller 372 by means of wire bundle 376 which in turn causes the primary controller 372 to de-energize the high voltage power supply and stop the sparking at electrode 304. The temperature in burner cup 44 is constantly measured by the temperature measuring means 386 and monitored by the fuel flow controller 374 by means of the connection through wire pair 388. If at any point the temperature drops below a preset temperature of for example 400° F., the fuel flow controller 374 sends a signal to the primary controller 372 by means of wire bundle 376. If the primary controller 372 registers the fact that the fuel flow is on and the temperature has fallen below the preset temperature of for example 400° F., the primary controller 372 will reenergize the high voltage power supply 378 causing high voltage to flow along wire 302 to electrode 304 where sparks will again be created in order to relight the fuel in the burner 298 and to re-establish the flame. The heat from the flame will again heat the temperature measuring means 386 which is monitored by the fuel flow controller 374 through wire pair 388.

Once the preset temperature of for example 400° F. is reached, the fuel flow controller 374 will send a signal to the primary controller 372 by means of the wire bundle 376 which will in turn cause the primary controller 372 to de-energize the high voltage power supply and stop the sparking at electrode 304. If the temperature is not re-established within a preset amount of time, the fuel flow controller 374 preferably de-energizes spring loaded normally closed solenoid valves 382 and 390 by de-energizing wires 384 and 392 respectively. Thus, a safety means for ensuring that the burner is lit is incorporated in the design.

The electrical energy from one or more coils, eg. generator coil 318, provides power to the rechargeable battery 394 by means of the wire pair 180. The battery 394 in turn provides power to the primary controller 372 to which it is attached. The primary controller 372 senses the input to the battery from the generator coil 318 which causes the primary controller 372 to send a signal to the displacer control coil 328 by means of wire 154. This positively polarized signal sent to the displacer control coil 328 causes an upward force on the magnet 286 which in turn causes the magnet 286 and the displacer 46 affixed thereto to move upwards towards magnet 288.

In addition to the basic cycle, the new heat engine optionally incorporates means to modulate the fuel burn and optimize energy efficiency. There are a plurality, eg. four, solenoid fuel valves 390, 294, 396 and 398 which are connected to the fuel flow controller 374 by means of wire pairs 392, 402, 404, and 406 respectively. The primary controller 372 senses the current flowing to the load 408 through wire pairs 410, 412, and 414 by means of the hall effect current sensor 416 which is connected to the primary controller 372 by means of wire pair 418. The power from the generator coils flows out to the load 408 (eg. an outlet or an electric apparatus) by means of wires 420 and 422. When the primary controller 372 determines that the current flowing to the load is, eg., between 0 to 25 percent of the maximum output power of the heat engine and generator, it ensures that only solenoid fuel valve 390 is energized by sending a signal along two of the eight wires in the wire bundle 376 which connects the primary controller 372 to the fuel flow controller 374. The fuel flow controller 374 in turn energizes only the spring loaded normally closed solenoid valves 382 and 390.

When the primary controller 372 determines that the current flowing to the load is, eg., between 26 to 50 percent of the maximum output power of the heat engine and generator, it sends a signal to the primary fuel controller 374 along two of the wires in the wire bundle 376. This signal causes the primary fuel controller 374 to energize an additional spring loaded normally closed solenoid fuel valve 396 by means of the wire pair 402 which causes the spring loaded normally closed solenoid fuel valve 396 to open thereby increasing the fuel flow to the burner 298.

When the primary controller 372 determines that the current flowing to the load is, eg., between 51 to 75 percent of the maximum output power of the heat engine and generator, it sends a signal to the primary fuel controller 374 along two of the wires in the wire bundle 376. This signal causes the primary fuel controller 374 to energize yet another spring loaded normally closed solenoid fuel valve 398 by means of the wire pair 404 which causes the spring loaded normally closed solenoid fuel valve 398 to open thereby further increasing the fuel flow to the burner 298.

When the primary controller 372 determines that the current flowing to the load is, eg., greater than 75 percent of the maximum output power of the heat engine and generator, it sends a signal to the primary fuel controller 374 along two of the wires in the wire bundle 376. This signal causes the primary fuel controller 374 to energize yet another spring loaded normally closed solenoid fuel valve 400 by means of the wire pair 406 which causes the spring loaded normally closed solenoid fuel valve 400 to open thereby further increasing the fuel flow to the burner 298. Conversely, if the power level decreases to the range below which the burner is operating, the system closes excess spring loaded normally closed solenoid fuel valves until the number of open valves and the load are matched.

Under normal operating conditions the output voltage controller 424 connect to the primary controller 372 by means of wire 426 and the voltage controller connects the wire pairs 410, 412 and 414 from generator coils 320, 322 and 324 in parallel and the output frequency of the generator is equal to the displacer frequency. If an overload occurs as sensed by current sensor 416, the voltage controller preferably disconnects the load 408 thereby protecting the generator. In the case where the output from the generator is being rectified, the frequency of operation of the displacer will also be varied so as to optimize efficiency of the system.

Regenerator

Figure 6A:
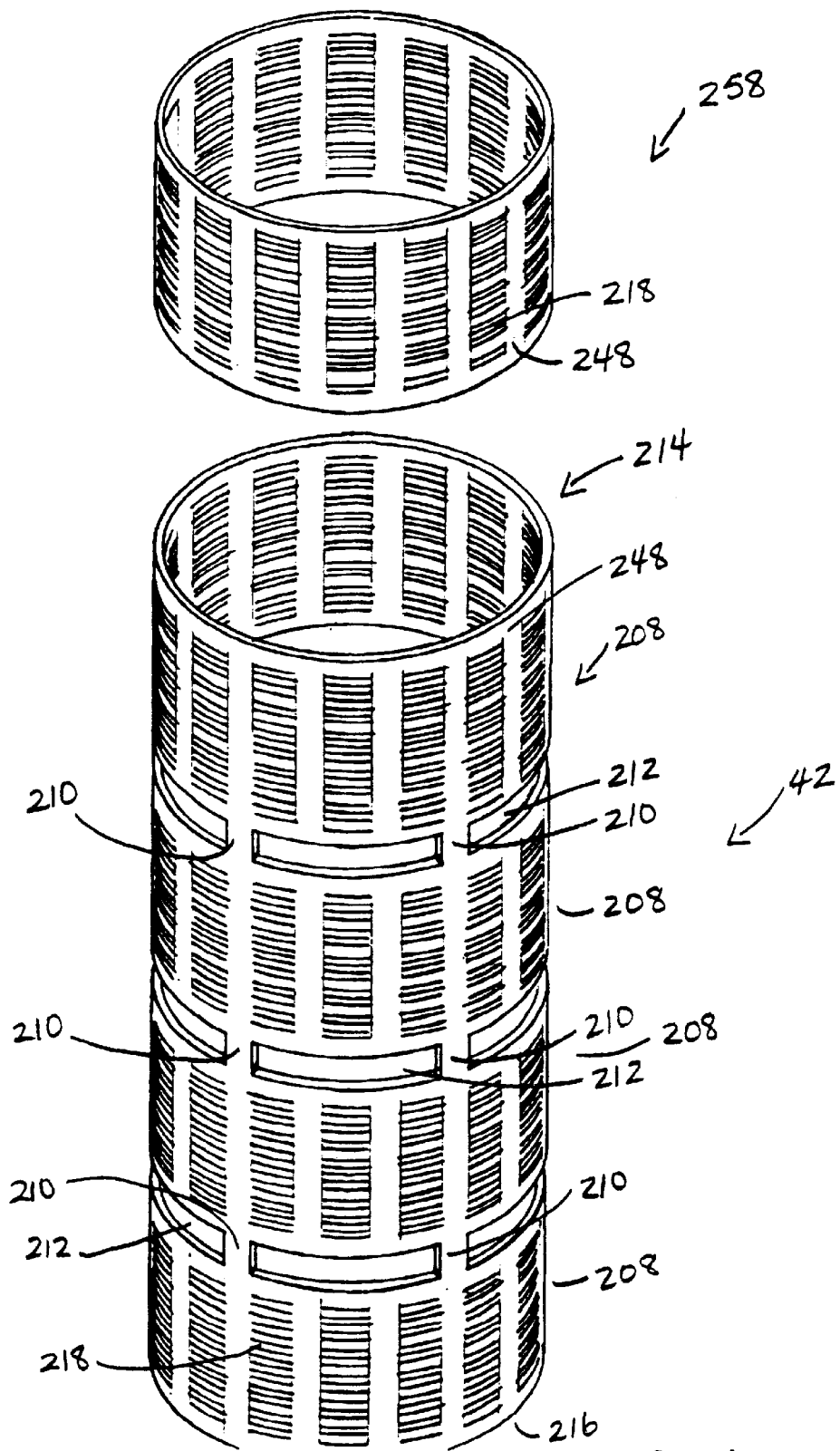
FIG. 6a is a perspective view of the heat exchanger for the heating zone and the regeneration zone.

In accordance with another aspect of this invention, a novel construction for a regenerator is provided. As shown in FIG. 6a, regenerator 42 is preferably also of a thin wall construction. In particular, regenerator 42 may be manufactured from copper (which may be coated with an inverting layer such as silicon monoxide and/or silicon dioxide), aluminum (which is coated with an inverting layer such as silicon monoxide and/or silicon dioxide), stainless steel or a super nickel alloy and have a thickness from about 0.0005 to about 0.005 inches, more preferably from about 0.001 to about 0.002 inches.

As shown in FIG. 6a, regenerator 42 may comprise a one and preferably a plurality of sections 208 which are joined together by a plurality of longitudinally extending members 210. Longitudinally extending members 210 are spaced apart on opposed sides of openings 212. Openings 212 define thermal breaks between sections 208 so as to minimize the heat conducted from hot end 214 to cool end 216. Accordingly, longitudinally extending members 210 are preferably as thin as possible in the circumferential direction so as to minimize the heat transferred between sections 208 while still maintaining sufficient structural integrity of regenerator 42 so that regenerator 42 may be handled as a single member. In the embodiment of FIG. 1, regenerator 42 comprises a plurality of individual sections 208.

Figure 17:
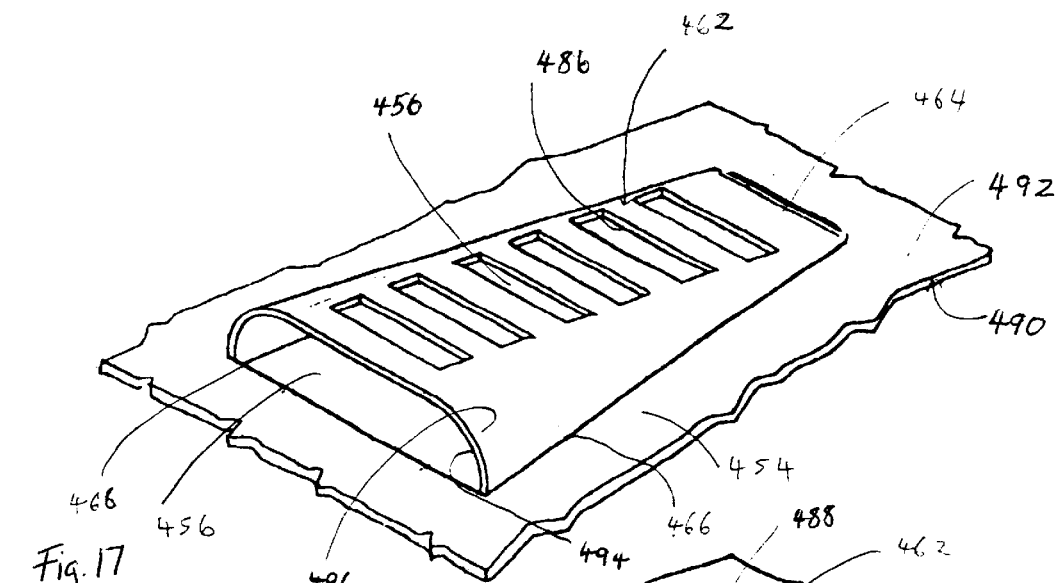
FIG. 17 is an enlarged view of the helical fin of FIG. 16 with an alternate louvre.
Figure 18A:
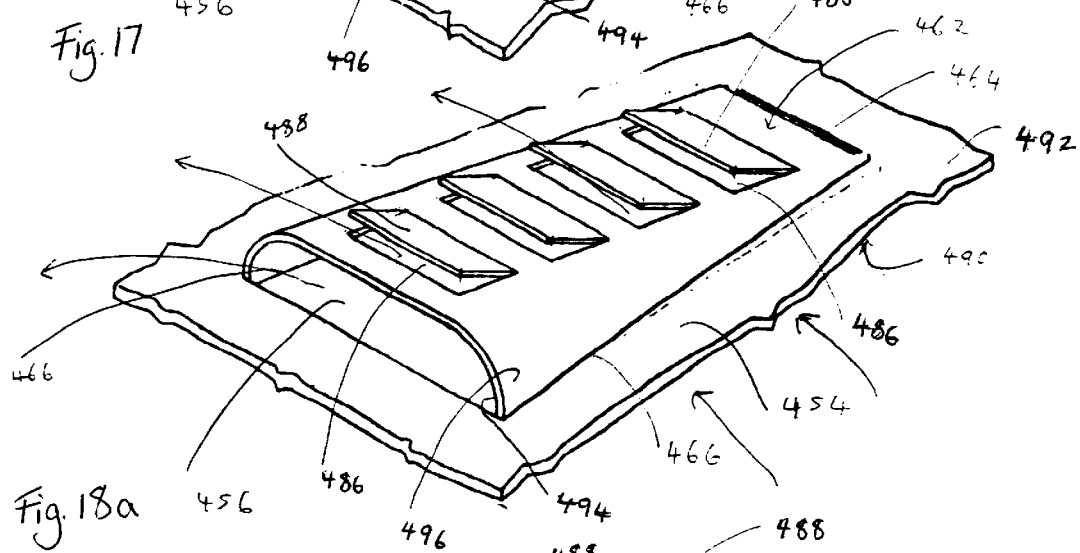
FIG. 18a is an enlarged perspective view of a louvre of the helical fin of FIG. 16 showing the sublouvres.
Figure 18B:
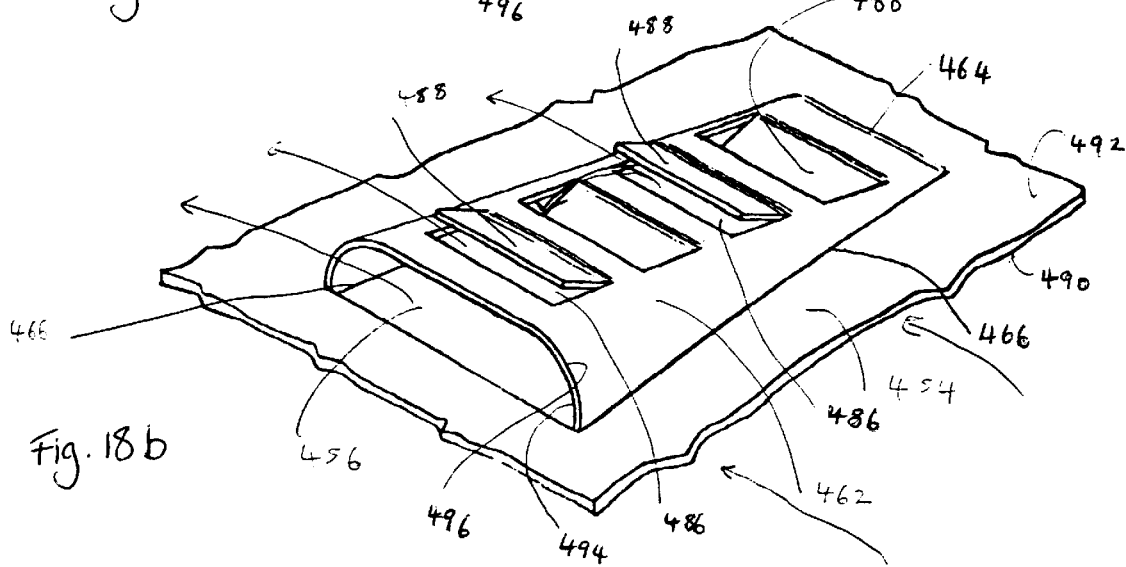
FIG. 18b is an enlarged perspective view of a louvre of the helical fin of FIG. 16 showing alternate sublouvres.

Regenerator 42 may be made from sheet metal which is roll formed. Then louvres (directing members) 218 and openings 212 are preferably formed (eg. by stamping). Subsequently, the material is formed into a cylindrical tube and may be spot welded together to form regenerator 42. Sublouvres (secondary directing members) may be provided as are shown in FIGS. 17, 18a and 18b. Regenerator 42 is positioned in fluid flow path 40 between outer and inner walls 12 and, 30 as exemplified in FIG. 2a, the regenerator preferably extends along a substantial portion of fluid flow path 40. As shown in FIG. 2a, regenerator 42 commences at about the top 136 of displacer 46 when displacer 46 is positioned distal to driver 48. Further, regenerator 42 preferably ends adjacent opening 158 in inner wall 30.

In order to improve the heat transfer between the working fluid and regenerator 42, regenerator 42 may have a plurality of louvres 218 provided therein. Exemplary louvres 218 are shown in more detail in FIG. 6d. Regenerator 42 comprises a main body portion 248. Louvres may be formed such as by stamping or other means known in the art. As shown in FIG. 6d, each louvres 218 comprises an angled panel which extends outwardly from main body portion 248 and has opposed flanges 250 extending between front portion 256 of angled panel 252 and main body portion 248. As shown in FIG. 6d, some of the louvres may have angled panels that extend in a first direction (e.g. upwards in FIG. 6d) and another set of louvres may extend in the opposite direction (e.g. downwards as shown in FIG. 6d). The designs which are shown in FIGS. 12d, 17, 18a and 18b may be used for louvres 218.

Figure 6B:
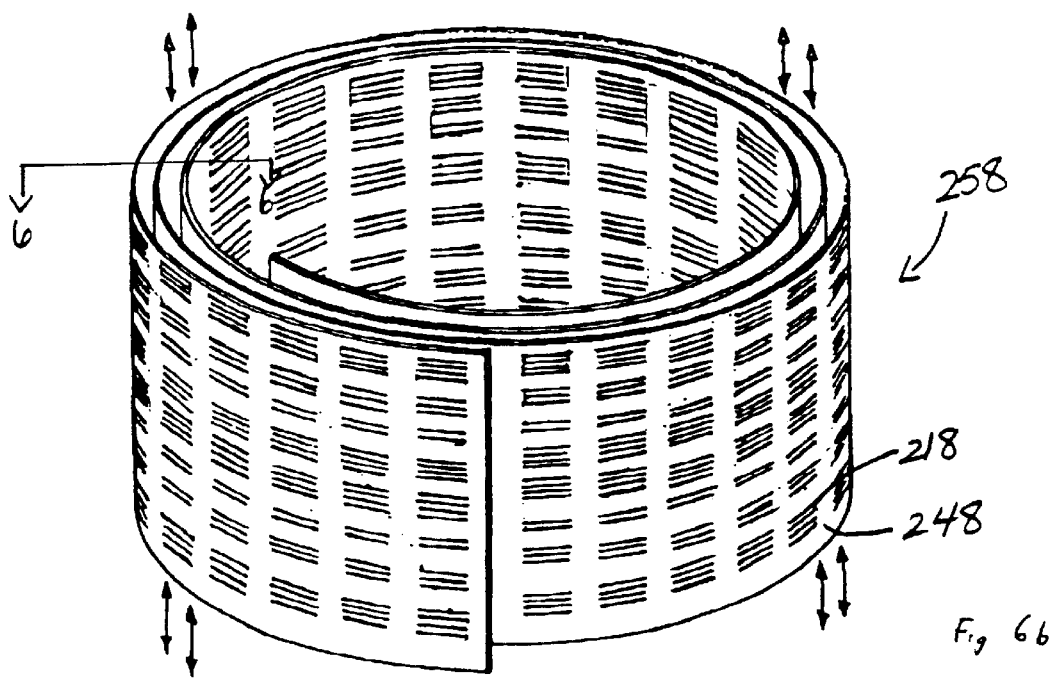
FIG. 6b is a perspective view of the air flow through an alternate version of the heat exchanger for the heating zone.
Figure 6C:
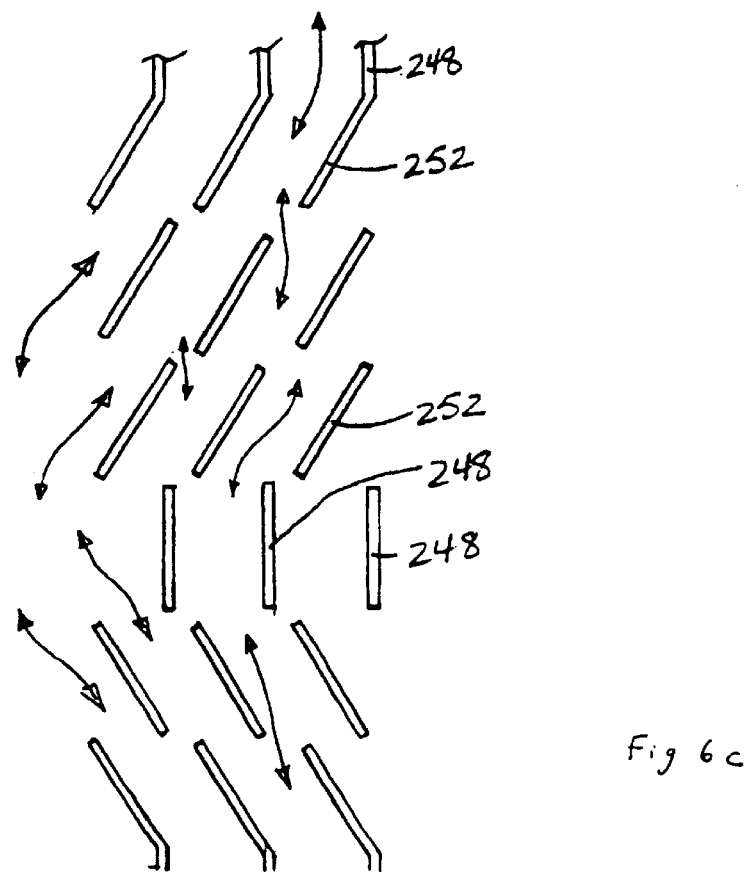
FIG. 6c is an cross section along the line 6—6 in FIG. 6b showing the air flow through the heat exchanger for the heating zone of FIG. 6b.
Figure 6D:
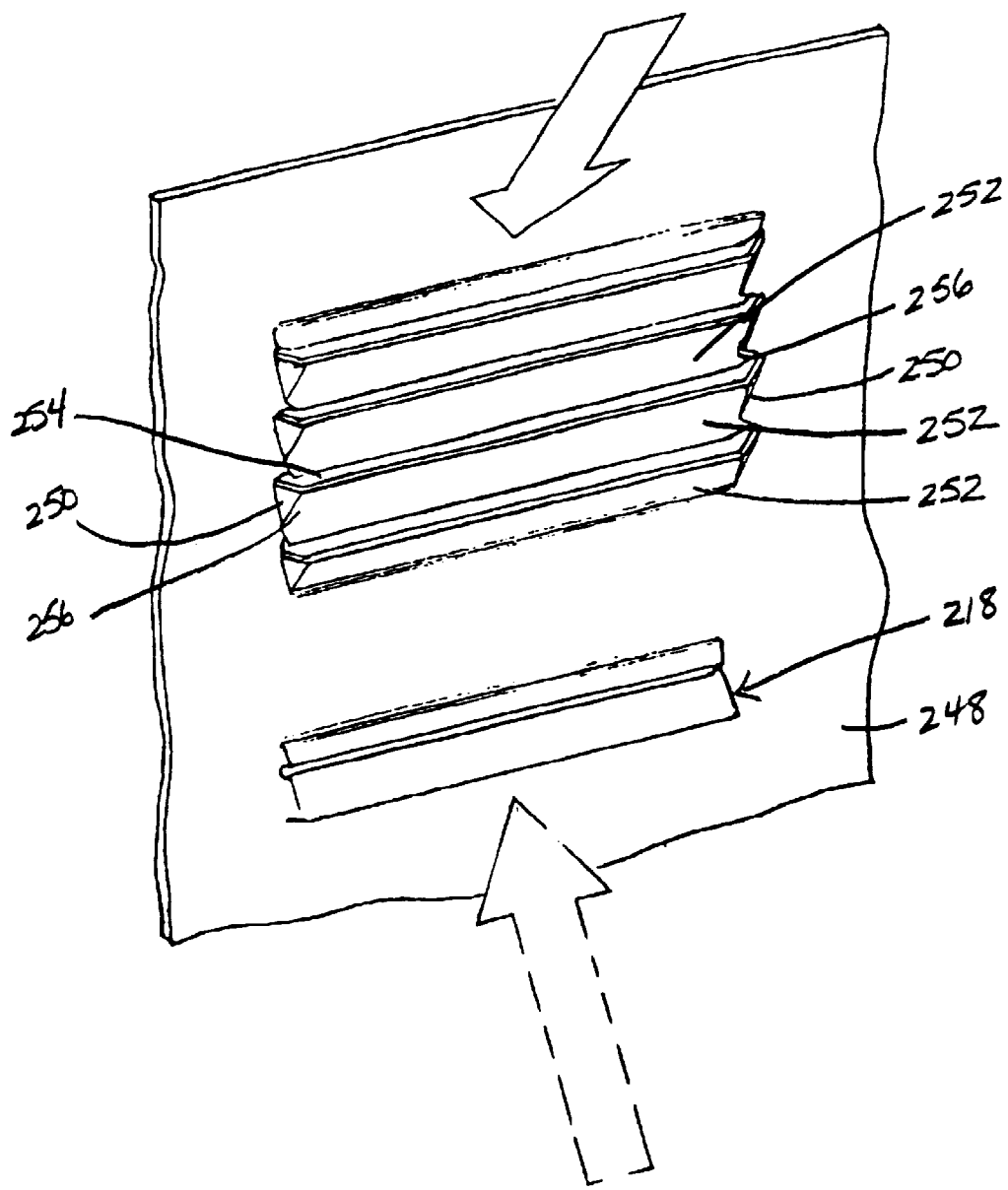

In FIGS. 6b and 6c, a heat exchanger using a coil of the material used to form regenerator 42 of FIG. 6a is shown. Regenerator is preferably fixed in position such as by spot welding regenerator 42 to one of outer and inner walls 12 and 30. Referring to FIG. 6c, arrows represent the flow of fluid through louvres 218. Louvres 218 direct the fluid to pass first from one side of main body portion 248 to the opposed side and, subsequently, a portion to flow from the opposed side back to the initial side of main body portion 248. The continual flow of fluid through main body portion 248 (from one side to the other) produces an improved heat transfer between the working fluid and regenerator 42. In particular, when the working fluid is passing through the regenerator from heating chamber 140 to cooling chamber 160, regenerator 42 accumulates heat which is transferred back to the working fluid when the working fluid travels from cooling chamber 160 to heating chamber 140.

It is to be appreciated that louvred fins may be used in place of part or all of regenerator 42. Further, a section 208 of the regenerator material may be used as a heat exchanger in passageway 64 or in the upper portion of passageway 40 provided that positioning members are provided to dimensionally stabilize the upper end of inner and outer walls 30 and 12. For example, one or more rings 476 may be provided adjacent the upper end of inner wall 30.

Heat exchanger 258 may also be incorporated into the portion of fluid flow path 40 which is positioned in heating zone 22. This is shown in particular in FIG. 2a. This heat exchanger assists in transferring heat from the exhaust gases in first pass 86 of heat exchanger 67 to the working fluid as it travels from heating chamber 140 to cooling chamber 160.

Heat exchanger 258 may be made from the same material as regenerator 42. This is shown in particular in FIG. 6a. In FIG. 6b, a heat exchanger 258 is shown comprising a plurality of layers of the louvres material shown in FIG. 6a. The number of layers of louvred main body portion 248 which is utilized as regenerator 42 or as heat exchanger 258 may vary depending upon the desired thermal efficiency of heat exchanger 258 as well as regenerator 42. For example, if the radial thickness of fluid flow path 40 is about 0.05 inches, then only a single layer heat exchanger 258 may be required as is shown in FIG. 6a.

Fins

Figure 16:
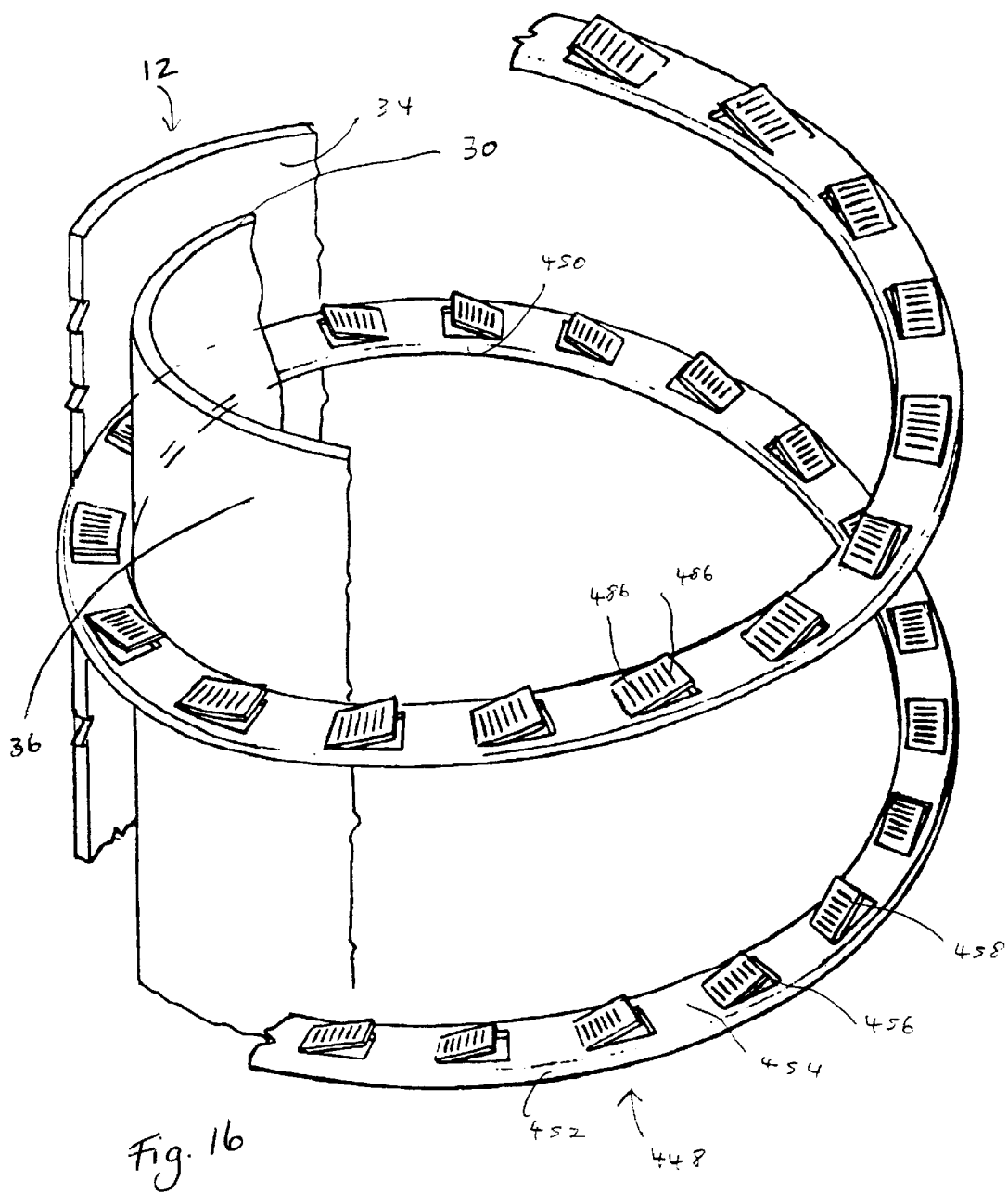
FIG. 16 is a perspective view of a helical fin.

In accordance with another aspect of this invention, there is provided a novel construction for heat exchangers. As discussed above, means to assist in transferring heat between the structural components of the heat engine and a fluid may be provided in any of the air flow passages of the heat exchanger. For example, they may be provided in passages 64, 40, 86, 88 and 102. At least one heat exchange member or fin is preferably provided in each fluid flow passage. In one embodiment, as exemplified by FIG. 14, the fins are constructed to allow the flow of fluid through the fin as the fluid flows axially through the heat exchanger. In another embodiment, the fins are constructed and arranged to produce a directed fluid flow as the fluid passes through the heat exchanger (e.g. see FIGS. 12, 12a, 13 and 16). A plurality of individual annular fins may be provided. Alternately, one or more continuous helical fins as shown in FIG. 16 may be provided. In either case, the fins define a plurality of rows of fins in the heat exchanger that the fluid encounters as it flows through the heat exchanger and thus the fluid is acted on by the fins several times as it flows through the heat exchanger. In a further embodiment, the fins are preferably provided with directing members whereby the fin is configured and arranges to produce a main flow of fluid which flows through the fin and to produce a secondary fluid flow which passes through the main directing members whereby the transfer of heat between the fluid and the heat exchanger is enhanced. Examples of such directing members are shown in FIGS. 16, 17, 18a and 18b. The directing members may be configured and arranged to produce a cyclonic or swirling flow of air (see FIG. 12e) or a cross-flow pattern (see FIG. 12f).

In the preferred embodiment of the heat exchanger, as exemplified by FIG. 1, the fins are positioned between two concentric cylinders which are spaced apart to define an air flow passage. A second air flow passage is positioned interior of the inner of the two concentric cylinders or exterior of the outer of the two concentric cylinders. The fins may be affixed to the wall of the heat exchanger by any means known in the heat exchanger art but are preferably mechanically affixed to one or both of the inner wall and the outer wall and extend all the way across the air flow passage. However, the instant fin design may be used in a passage of any particular configuration for a heat exchanger. For example, the heat exchanger could have a square cross-section defining a first fluid flow passage with the fins longitudinally spaced apart in the passage. A plurality of generally parallel tubes (for containing a fluid at a second temperature) could extend longitudinally through the fins to thereby define a heat exchanger with a square cross-section.

Figure 12:
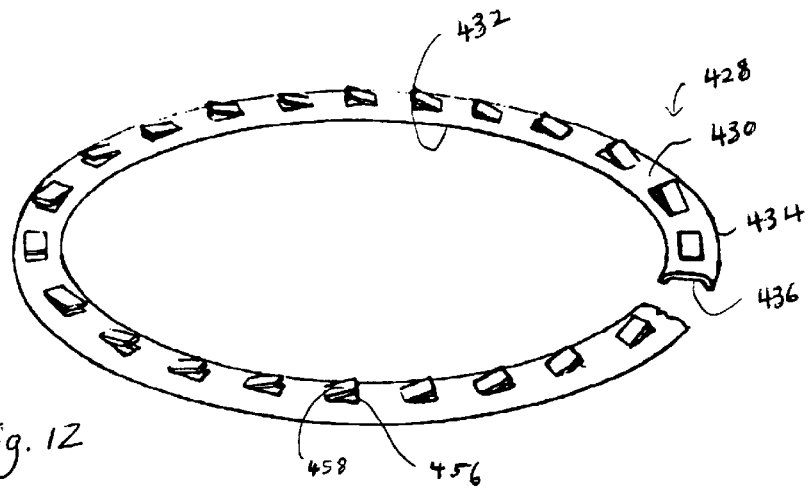
FIG. 12 is a perspective view of a louvred fin.

Referring to FIG. 12, annular fin 428 has a top surface 430 and inner edge 432, an outer edge 434 and a lower surface 436. Top and bottom surfaces 430 and 436 are opposed surfaces of fin 428. Inner and outer edges 432 and 434 are curved and have a portion which abuts against the longitudinally extending surface of a wall. See for example surface 438 of FIG. 12b. Such rings may be used in a fluid flow passage which exists between spaced apart cylindrical tubes. For example, such rings may be inserted in passageways 64 or 102 (see FIG. 1). In order to provide a plurality of annular fins 428 in passageway 102, outer burner shield 70 could be placed inside air preheat shield 72 to define passageway 102. Any desired number of rings, preferably a plurality thereof, could be inserted into passageway 102 one at a time with edges 432 and 434 pointing towards entry port 104. Rings would then slide along the inner walls of shields 70 and 72 until they were positioned in the desired location. Annular fins 428 are preferably sized such that edges 432 and 434 are drawn towards each other upon insertion into passageway 102. The pressure between edges 432 and 434 mechanically lock annular fins 428 in position. Preferably, the pressure which is exerted between fin 428 and shields 70 and 72 is sufficient to ensure that the rate of heat transfer between shields 70 and 72 and annular fin 428 is maintained over the normal operating temperature of shields 70 and 72. In this way, as the dimension of passageway 102 may change under different thermal conditions, sufficient contact will be maintained between the annular fins and the walls of passageway 102 to ensure that the desired rate of heat transfer is maintained.

Figure 12A:
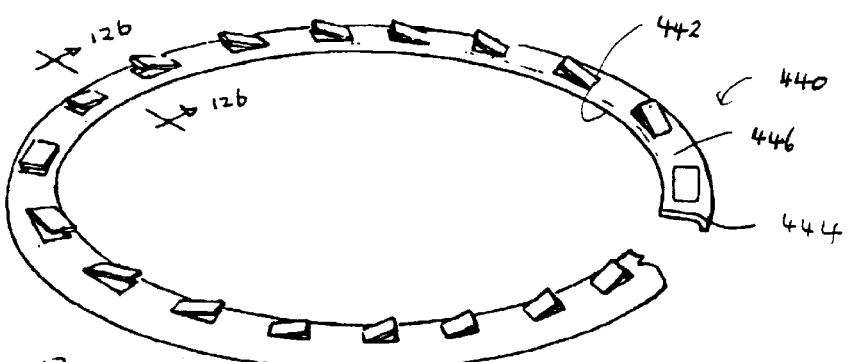
FIG. 12a is a perspective view of another louvred fin.
Figure 12B:
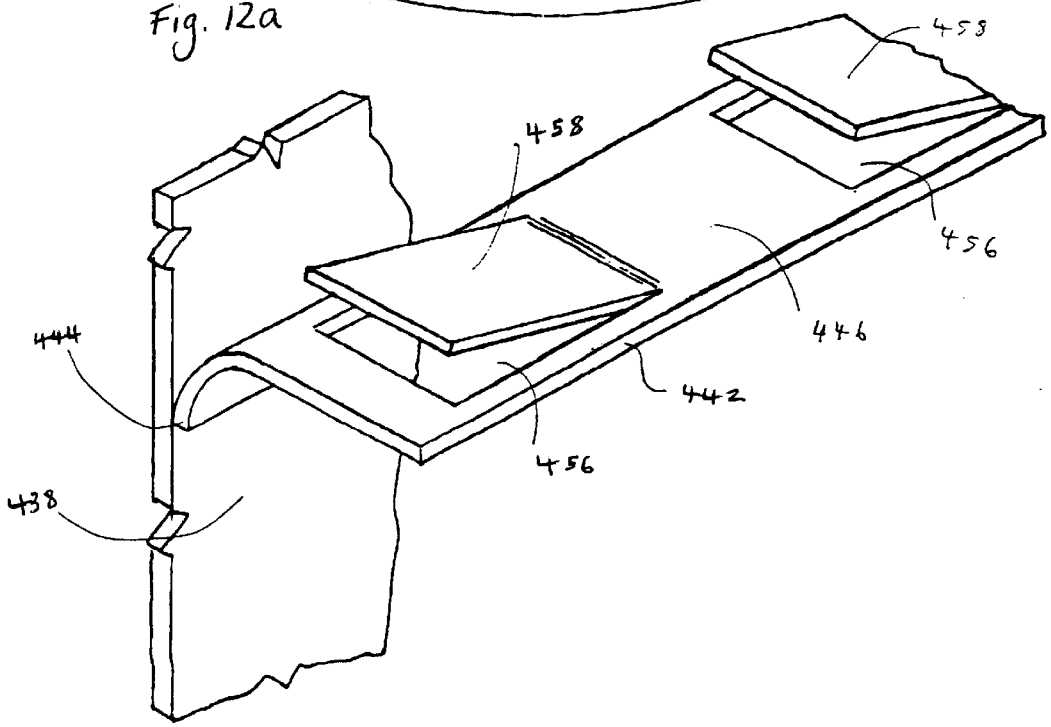
FIG. 12b is a cross section of a cylindrical tube with the louvred fin of FIG. 12a attached thereto.

Another embodiment of such an annular fin is shown in FIG. 12a. In this embodiment annular fin 440 has opposed surfaces (i.e. top surface 446 and the bottom surface) which is generally flat (so as to be generally transverse to the longitudinal fluid flow path through the heat exchanger) and an outer edge 444 which is curved as in the case of annular fin 428 to define a collar. Inner edge 442 is not curved. Examples of such fins are shown in passage 102 of FIG. 1. The outer diameter of fin 440 is selected such that when inserted into annular passage 102, the pressure which is exerted between outer edge 444 and inner surface of outer burner shield 72 will deform the collar and lockingly hold annular fin 440 in position. It will be appreciated that a curved edge (or collar) may be provided instead only on the inner edge. For example, referring to the fins shown in passageway 88 of FIG. 1, inner edge 442 may be curved so as to have the collar like portion of fin 440 of FIG. 12a so as to lockingly engage a wall positioned on the interior of the ring (in this case, inner burner shield 68). The top surface of the fin preferably extends horizontally to have a blunt nosed edge. In this embodiment, the inner diameter of the annular fin is selected so as to be slightly smaller than inner burner shield 68 so as to lockingly engage inner burner shield 68 when inserted therein. Accordingly, in accordance to one aspect of this invention, fins which have air flow passages there through are provided to lockingly engage one or both walls of an annular passage to thereby maintain contact with the selected walls over the operating temperature of the heat exchanger. The passages may be provided as openings 456 in a fin or by passages 474 between blades 472 of a fin (see FIG. 13).

As shown in FIG. 16, one or more helical fins 448 may be provided instead of a plurality of individual annular fins such as fins 428 or 440. Helical fin 448 is shown in FIG. 16 in an embodiment where it is positioned in the annular passage between outer and inner walls 12 and 30. In this embodiment, helical fin 448 has curved inner and outer edges 450 and 452 for locking engagement with surfaces 36 and 34 respectively. It will be appreciated that helical fin 448 need have only one curved edge (either inner out outer) so as to lockingly engage only a single wall 12 or 30.

When used in a heat exchanger, the fins are preferably constructed to allow a fluid to flow there through to enhance the heat transfer between the fluid and the heat exchanger. In the embodiment of FIGS. 12 and 12a, fins 428 and 440 are designed to extend fully across the annular gap between and inner and an outer wall. Therefore, fin 428 is provided with a plurality of openings 456. In order to improve the heat transfer between the fluid and the heat exchanger, comprising fin 428 and the surface of the walls with which fin 428 is in contact, a plurality of directing members 458 may be provided. As the air travels longitudinally, in the direction of axis A of FIG. 2a, the air encounters top or bottom surface 430 or 436 of fin 428 and passes through openings 456, heat is transferred between fin 428 and the fluid passing through the heat exchanger.

As shown in FIGS. 12 and 12a, each of the direction members 458 extends upwardly in the same direction. Accordingly, as fluid travels longitudinally (or axially) through the heat exchanger, the fluid will be deflected by directing members 458 to swirl around in a cyclonic type flow. Accordingly, for example, referring to the embodiment of FIG. 12e, a plurality of fins 428 may be positioned on outer surface 32 of outer wall 12. As fluid travels upwardly through openings 456, directing members 458 will cause the air to flow cyclonically around outer wall 32.

Figure 12C:
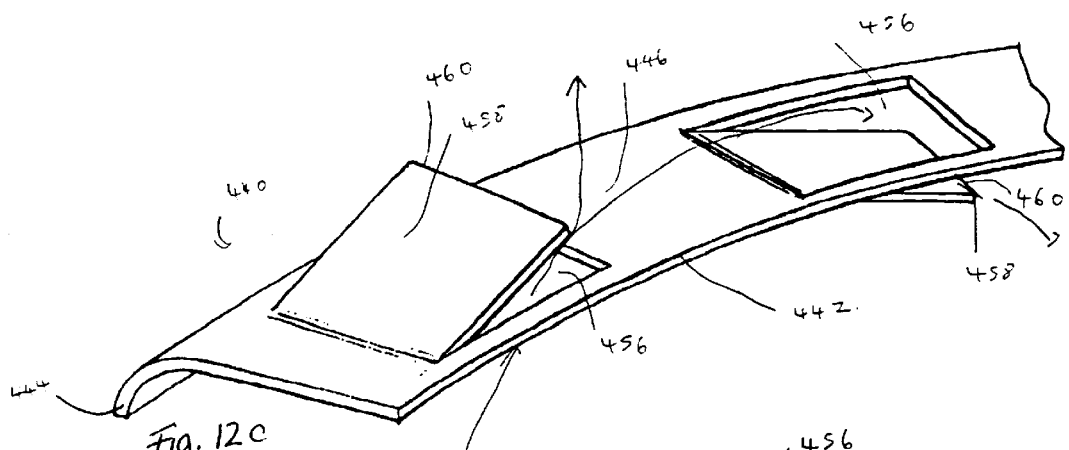
FIG. 12c is a perspective view of an alternate louvred fin.
Figure 12D:
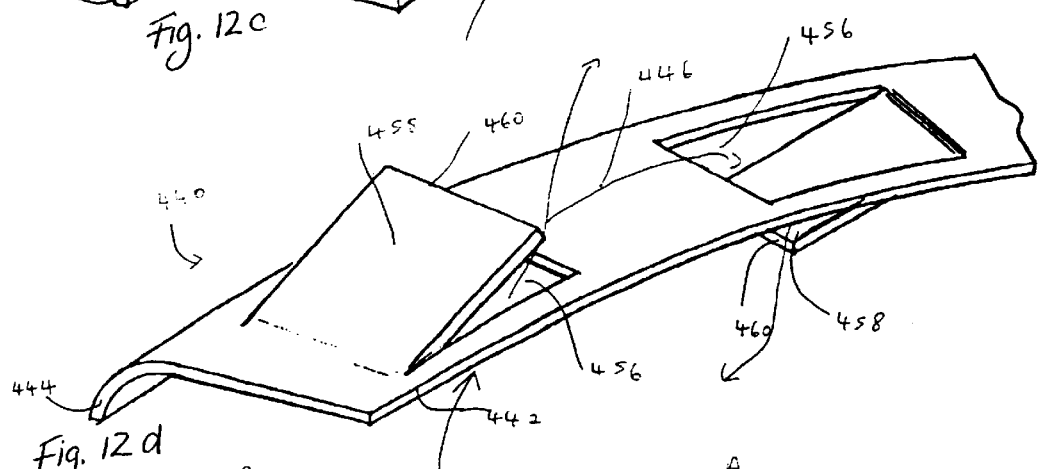
FIG. 12d is a perspective view of an alternate louvred fin.

As exemplified by FIGS. 12c and 12d, some of the directing members 458 extend upwardly from top surface 446 and some extend downwardly. As shown in FIG. 12c, directing members 458 may extend away from surface 446 in the same direction or, alternately, as shown in FIG. 12d, they may extend towards each other. Preferably, directing members 458 extend towards each other as shown in FIG. 12d.

Directing members 458 have a distal end 460 spaced circumferentially from the position where directing member 458 contacts top surface 446. As air travels through opening 456, it travels along the bottom surface of directing member 458 until it encounters distal end 460. When the fluid encounters distal end 460, turbulent flow is created. As a result of the turbulent flow, a portion of the fluid, preferably at least about 65%, continues to travel upwardly through the heat exchanger while the remainder of the fluid is caused to travel in a reverse manner through an adjoining opening 456 to the lower surface of fin 440. Accordingly, directing members 458 cause a portion of the fluid travelling through the heat exchanger to pass at least twice, and preferably three times, through a fin 440 as the fluid travels axially through the heat exchanger. For example, as the fluid flows through the heat exchanger, a portion of the fluid which has travelled through a fin 440 from lower surface 436 to top surface 430 will travel in the reverse direction from top surface 430 to lower surface 436. This portion of the fluid may then be reentrained in the longitudinal flow of fluid through the heat exchanger and travel again from lower surface 436 to top surface 430 and continue on flowing through the heat exchanger to encounter another fin 440. This is shown in particular in FIG. 12f. This type of flow wherein the directing members are configured and arranged to cause a portion of the fluid which has passed through the a fin from the first opposed side to the second opposed side to then pass from the second opposed side to the first opposed side is referred to as "cross-flow". This flow is advantageous as it causes a portion of the fluid to be in contact with fin 440 for a greater period of time thereby increasing the heat transfer between fin 440 and the fluid.

Directing members may be formed in several ways. As shown in FIGS. 12c and 12d, directing members 458 constitute a flange which may be cut or stamped from surface 446. In such a case, only one edge of directing member 458 may be in contact with the remainder of the fin. An alternate construction of a directing member is shown in FIGS. 17, 18a and 18b. In this case, directing member 462 is in contact with the fin over more than one surface. In particular, as shown in FIGS. 17, 18a and 18b, directing member 462 has a transverse or radial side 464 which is in contact with top surface 454 as well as opposed longitudinal edges 466 which are in contact with top surface 454. The increased contact surface between directing member 462 and the fin permit a greater amount of heat to be transferred between directing member 462 and the fin thus improving heat transfer between directing member 462 and the fluid flowing through opening 456. Directing members 462 may be produced by a stamping operation. Directing members 462 may be provided on any of the fins described herein.

Figures 12E, 12F:
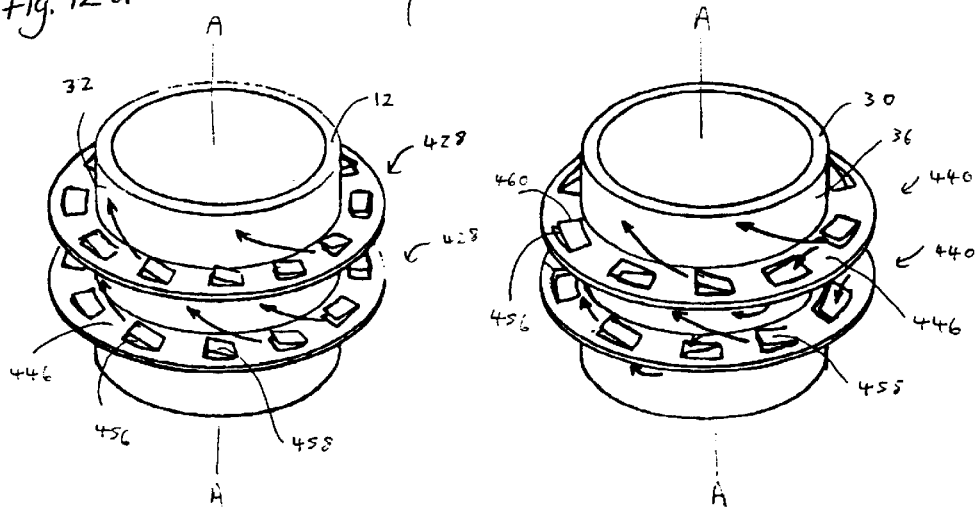
FIG. 12e is a perspective view of a portion of a heat exchanger with louvred fins and cyclonic flow in the circulating fluid as the fluid travels axially through the heat exchanger.
FIG. 12f is a perspective view of a portion of a heat exchanger with louvred fins and cross flow in the circulating fluid as the fluid travels axially through the heat exchanger.
Figure 13:
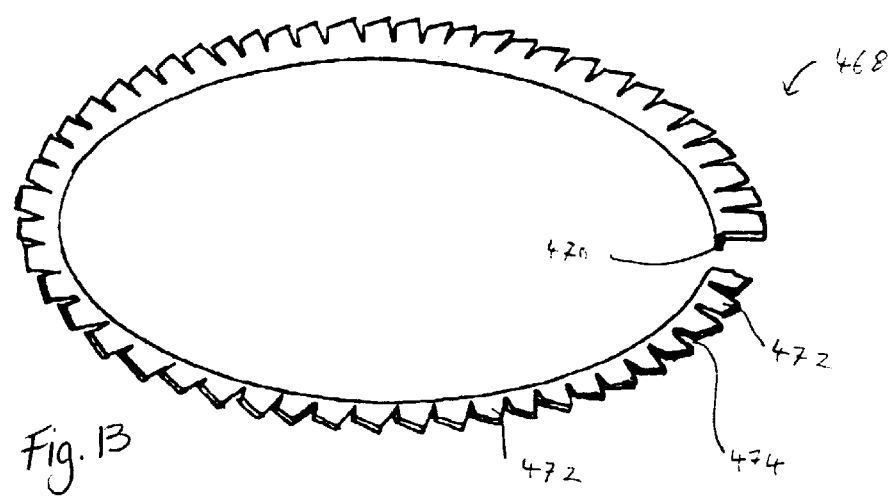
FIG. 13 is a perspective view of a radial blade.

In an alternate embodiment, the fin may comprise an annular member which comprises a radial blade. In particular, as shown in FIG. 13, fin 468 may have a hub (which may be a curved inner edge or collar 470) and a plurality of blades 472 which extend outwardly, and preferably radially outwardly, therefrom (or a hub and a plurality of blades which extend inwardly). Blades 472 are preferably angled with respect to the plane of fin 468 so as to direct air to flow in a prescribed pattern through the heat exchanger. The spacing between adjacent blades 472 comprises a passage 474 through which a fluid may flow. It will be appreciated that blades 472 may be oriented in the same direction (as is the case with directing members 458 in FIG. 12), thus causing a swirling flow of the fluid in the heat exchanger as is represented by FIG. 12e. It will be appreciated that some of blades 472 may direct the fluid upwardly whereas others may direct the fluid downwardly (in the same manner as directing members 458 of FIGS. 12c or 12d) to create a cross-flow as shown by FIG. 12f. It will further be appreciated that, as with fin 440, radial blades 472 preferably extend substantially all and preferably all the way across the annular space between the concentric cylinders so as to direct as much air as possible to flow through passages 474.

Figure 14:
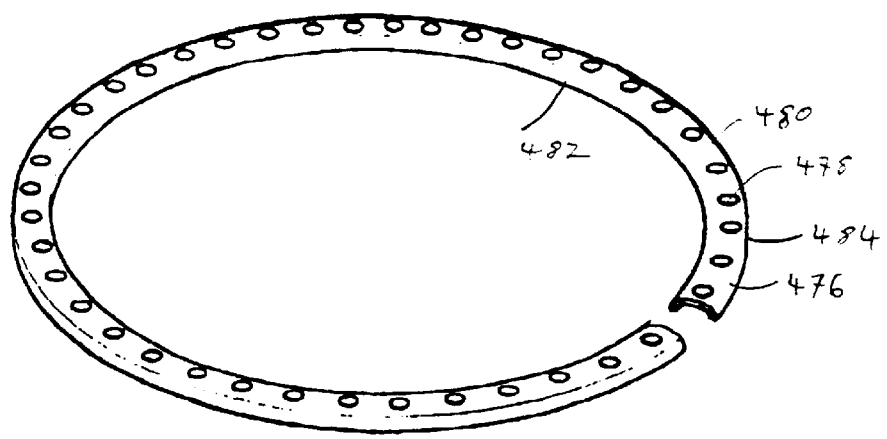
FIG. 14 is a perspective view of a further embodiment of a spacer ring.

In some circumstances, a limited amount of heat may need to be transferred between the fluid and the fin. In such a case, the fin may be provided with openings without any directing members. An example of such a fin is shown in FIG. 14. In this case, the fin comprises a ring 476 having a plurality of openings (for example circular openings 478) provided in top surface 480. Once again, inner and/or outer edge 482 and 484 may be curved as shown in FIG. 14.

In a further preferred embodiment, the directing members are themselves provided with directing members so as to cause the fluid to travel through the directing member as the fluid passes through the heat exchanger. An example of such a directing member is shown in FIG. 16. In this case, directing member 458 is provided with at least one and preferably a plurality of openings 486 provided therein. For example, referring to FIG. 17, directing member 462 has a plurality of openings 486 provided therein. Some of the fluid will travel through openings 486 as the fluid travels through openings 456 in the fin. Preferably, as shown in FIGS. 18a and 18b, the directing member is a main directing member and has a plurality of secondary directing members 488 or sublouvres provided thereon. It will be appreciated that the secondary directing members may use the construction techniques of fins 440 (eg. it may be a flanged or stamped opening) or of fins 468 (eg. it may be a passage through a blade). As in the case with the main directing members, a secondary directing member is preferably associated with each secondary opening 486. As shown in FIG. 18a, secondary directing members 488 may all be oriented in the same direction such that as the fluid flows axially through the fin from lower surface 490 to upper surface 492, the fluid passes only once (i.e. unidirectionally) from lower or inner surface 494 of directing member 462 to upper or outer surface 496 of directing member 462 (inner surface 494 and outer surface 496 are opposed surfaces). In the alternate embodiment of FIG. 18b, some of the secondary directing members 488 extend upwardly from upper surface 496 and some extend downwardly from lower surface 494. As shown in FIG. 18b, directing members may alternately extend upwardly and downwardly or they may be in any other random pattern (as is also the case with main directing members 458 in the embodiments of FIGS. 12c and 12d). In this case, as the fluid travels axially through the heat exchanger from lower surface 490 to upper surface 492 of the fin, a portion of the fluid will be caused to pass at least twice through main directing member 462 due to turbulent flow created by secondary directing members 488 thus creating cross flow of fluid similar to that shown in FIG. 12f. It will be appreciated that openings and preferably openings with associated secondary directing members 488 may also be provided on blades 472. In another embodiment, blades 472 may be provided as secondary directing members.

In accordance with another aspect of this invention, any of these fin designs may be provided on the outer surface of outer wall 12 as shown in FIG. 1 to assist in cooling chamber 160. These fins may define the outer perimeter of the heat engine. Alternately, as shown in FIG. 1, a further outer cylindrical sleeve 522 may be provided. This may be an extension of air preheat shield 72. Air flow path 524 is an extension of preheat air flow path 102 and is used to transfer heat from the cooling chamber to the air for combustion. As shown in FIG. 1, the cooling fins of heat exchanger 330 transfer heat from outer wall 12 to the air for combustion. A fan is optionally provided for producing forced convection flow through air flow path 524. The fan may be mounted at any position to provide this flow. As shown in FIG. 1, the fan is provided adjacent the entrance to air flow path 524. The fan comprises a motor 526 and a fan blade 528 driven by the motor. Preferably, both motor 526 and fan blade 528 are annular. They may be mounted on one or both of the walls that define air flow path 524 (i.e., outer wall 12 and/or sleeve 522 in the embodiment of FIG. 1). If fan 528 is annular, then it may be mounted on an annular fan mount 530 which is drivenly connected to annular motor 526.

In accordance with another aspect of this invention, any of these fin designs may be provided on the inner surface 60 of heater cup 44 as shown in FIG. 1 to assist in transferring heat from the combustion gas in combustion chamber 92 to the wall of heater cup 44 (the combustion chamber housing) as exemplified by reference numeral 532 in FIG. 1).

It will be appreciated by those skilled in the art that other modifications may be made to a heat engine and the flashlight disclosed herein and all of these are within the scope of the following claims. For example, the construction of regenerator 42 and the construction of the louvred heat exchanger may be used in any application heat exchange application.

Any heat exchanger construction known in the art may be used with the thin walled design provided herein to provide a heat exchanger means between the hot exhaust gases produced in burner cup 44 and the working fluid in the heat engine. In order to increase the thermal efficiency of the heat engine, the air for combustion may be preheated such as by use of the exhaust gas.

I claim:

1. A heat engine body comprising:
   (a) an outer longitudinally extending wall, an inner longitudinally extending wall spaced from the outer longitudinally extending wall to define a first passageway, each wall having an inner surface and an outer surface, the inner wall surrounding a cavity, each of the inner and outer walls having longitudinally spaced apart first and second ends, a heat source mounted at the first end and spaced from the inner wall to define a second passageway, the first and second ends in fluid flow communication via the first and second passageways, the first and second ends and the first and second passageways defining a sealed region within which a working fluid is circulated;
   (b) a first heat exchanger mounted in the first passageway comprising at least one fin having first and second opposed sides and constructed to direct the working fluid as it flows through the first heat exchanger to enhance heat transfer between the working fluid and the first heat exchanger; and,
   (c) a second heat exchanger mounted in the second passageway comprising at least one fin having first and second opposed sides and constructed to direct the working fluid as it flows through the second heat exchanger to enhance heat transfer between the working fluid and the second heat exchanger the at least one fin of at least one of the first and second heat exchangers including a plurality of longitudinally spaced apart fins or a helical fin.

2. The heat engine body as claimed in claim 1 wherein the heat source comprises a combustion chamber mounted at the first end, the burner chamber is in fluid flow communication with an exhaust gas passageway and a portion of the exhaust gas passageway is positioned adjacent the first passageway.

3. The heat engine body as claimed in claim 2 further comprising a third heat exchanger mounted in the exhaust gas passageway and comprising at least one fin having first and second opposed sides and constructed to direct the exhaust gas as it flows there through to enhance heat transfer between the exhaust gas and the third heat exchanger.

4. The heat engine body as claimed in claim 1 wherein the inner wall is cylindrical and the heat source is mounted substantially within the inner wall whereby the second passageway is annular.

5. The heat engine body as claimed in claim 1 wherein the at least one fin is configured and arranged to permit fluid to flow from the first opposed side to the second opposed side and to direct fluid from the second opposed side to the first opposed side.

6. The heat engine body as claimed in claim 1 wherein the at least one fin has main directing members and fluid flow passages through which the fluid may pass through the fin, the main directing members are configured and arranged to cause a portion of the fluid which has passed through the fin from the first opposed side to the second opposed side to then pass from the second opposed side to the first opposed side.

7. The heat engine body as claimed in claim 1 wherein the at least one fin is configured and arranged to cause at least a portion of the fluid to swirl around the passageway within which the at least one fin is positioned.

8. The heat engine body as claimed in claim 1 wherein at least some of the fins are constructed from metal and are prepared by stamping.

9. The heat engine body as claimed in claim 1 wherein at least some of the fins have a deformable collar for lockingly engaging the wall to which the fin is attached.

10. The heat engine body as claimed in claim 1 wherein at least some of the fins are mechanically mounted to at least one wall of the heat exchanger by a pressure which is exerted between the fins and the at least one wall which is sufficient to ensure that the rate of heat transfer between the at least one wall and the fins is maintained over the normal operating temperature of the at least one wall.

11. The heat engine body as claimed in claim 6 wherein at least one of the main directing members is configured and arranged to cause a portion of the fluid to pass at least twice through the main directing member as the fluid flows through the fin.

12. The heat engine body as claimed in claim 6 wherein at least one of the main directing members has a first side, a second side and is configured and arranged to cause a portion of the fluid to flow unidirectionally from the first side of a main directing member to the second side of the main directing member as the fluid flows through the fin.

13. The heat engine body as claimed in claim 7 wherein the at least one fin has at least one main directing member which is configured and arranged to cause a portion of the fluid to pass at least twice through the main directing member as the fluid flows through the fin.

14. The heat engine body as claimed in claim 7 wherein the at least one fin has at least one main directing member, the main directing member having a first side, a second side and is configured and arranged to cause a portion of the fluid to flow unidirectionally from the first side of a main directing member to the second side of the main directing member as the fluid flows through the fin.

15. The heat engine body as claimed in claim 1 wherein the at least one fin has a hub adjacent a wall of the passageway within which the at least one fin is positioned and an annular body portion extending away from the hub, and openings and main directing members are provided in the annular body portion.

16. The heat engine body as claimed in claim 1 wherein the at least one fin has a hub adjacent a wall of the passageway within which the at least one fin is positioned and a plurality of blades extending away from the hub, the blades defining passages through which the fluid flows.

17. A heat engine body comprising:
   (a) a container defining a sealed region within which a working fluid is circulated when the heat engine is in use, the sealed region having first and second portions, the first portion is at a different temperature than the second portion when the heat engine is in use, the first and second portions being in fluid flow communication via a working fluid passageway;
   (b) a combustion chamber positioned to provide heat to one of the first and second portions of the sealed region; and,
   (c) a heat exchanger having a combustion air passageway for providing air for combustion to the combustion chamber and an exhaust gas passageway for withdrawing exhaust gas from the combustion chamber, a portion of the working fluid passageway is contained in the heat exchanger, a portion of the combustion air passageway is thermally connected to a portion of the exhaust air passageway and a portion of the working fluid passageway is thermally connected to a portion of the exhaust air passageway, at least one of the passageways having fin portions having first and second opposed sides and constructed to direct a fluid to flow through the second heat exchanger to enhance heat transfer between the fluid and the heat exchanger at least some of the fin portions are configured and arranged to permit fluid to flow from the first opposed side to the second opposed side and to direct fluid from the second opposed side to the first opposed side, at least one fin has at least one main directing member which is configured and arranged to cause a portion of the fluid to pass at least twice through the main directing member as the fluid flows through the fin.

18. The heat engine body as claimed in claim 17 wherein at least some of the fin portions comprise a plurality of longitudinally spaced apart fins.

19. The heat engine body as claimed in claim 17 wherein the fin portions comprise a helical fin.

20. The heat engine body as claimed in claim 17 wherein at least one fin is mechanically affixed to at least one wall of the passageway within which the at least one fin is positioned by a pressure which is exerted between the at least one fin and the at least one wall that is sufficient to ensure that the rate of heat transfer between the at least one wall and the at least one fin is maintained over the normal operating temperature of the heat engine.

21. A heat engine body comprising:
(a) a container defining a sealed region within which a working fluid is circulated when the heat engine is in use, the sealed region having first and second portions, the first portion is at a different temperature than the second portion when the heat engine is in use, the first and second portions being in fluid flow communication via a working fluid passageway;
(b) a combustion chamber positioned to provide heat to one of the first and second portions of the sealed region; and,
(c) a heat exchanger having a combustion air passageway for providing air for combustion to the combustion chamber and an exhaust gas passageway for withdrawing exhaust gas from the combustion chamber, a portion of the working fluid passageway is contained in the heat exchanger, a portion of the combustion air passageway is thermally connected to a portion of the exhaust air passageway and a portion of the working fluid passageway is thermally connected to a portion of the exhaust air passageway, at least one of the passageways having fin portions having first and second opposed sides and constructed to direct a fluid to flow through the second heat exchanger to enhance heat transfer between the fluid and the heat exchanger at least some of the fin portions are configured and arranged to permit fluid to flow from the first opposed side to the second opposed side and to direct fluid from the second opposed side to the first opposed side, at least one fin has at least one main directing member which has a first side, a second side and is configured and arranged to cause a portion of the fluid to flow unidirectionally from the first side of a main directing member to the second side of the main directing member as the fluid flows through the fin.

22. A heat engine body comprising:
(a) a container defining a sealed region within which a working fluid is circulated when the heat engine is in use, the sealed region having first and second portions, the first portion is at a different temperature than the second portion when the heat engine is in use, the first and second portions being in fluid flow communication via a working fluid passageway;
(b) a combustion chamber positioned to provide heat to one of the first and second portions of the sealed region; and,
(c) a heat exchanger having a combustion air passageway for providing air for combustion to the combustion chamber and an exhaust gas passageway for withdrawing exhaust gas from the combustion chamber, a portion of the working fluid passageway is contained in the heat exchanger, a portion of the combustion air passageway is thermally connected to a portion of the exhaust air passageway and a portion of the working fluid passageway is thermally connected to a portion of the exhaust air passageway, at least one of the passageways having fin portions having first and second opposed sides and constructed to direct a fluid to flow through the second heat exchanger to enhance heat transfer between the fluid and the heat exchanger at least some of the fin portions are configured and arranged to cause at least a portion of the fluid to swirl around the passageway within which the fin portions are positioned, at least one fin has at least one main directing member which is configured and arranged to cause a portion of the fluid to pass at least twice through the main directing member as the fluid flows through the fin.

23. A heat engine body comprising:
(a) a container defining a sealed region within which a working fluid is circulated when the heat engine is in use, the sealed region having first and second portions, the first portion is at a different temperature than the second portion when the heat engine is in use, the first and second portions being in fluid flow communication via a working fluid passageway;
(b) a combustion chamber positioned to provide heat to one of the first and second portions of the sealed region; and,
(c) a heat exchanger having a combustion air passageway for providing air for combustion to the combustion chamber and an exhaust gas passageway for withdrawing exhaust gas from the combustion chamber, a portion of the working fluid passageway is contained in the heat exchanger, a portion of the combustion air passageway is thermally connected to a portion of the exhaust air passageway and a portion of the working fluid passageway is thermally connected to a portion of the exhaust air passageway, at least one of the passageways having fin portions having first and second opposed sides and constructed to direct a fluid to flow through the second heat exchanger to enhance heat transfer between the fluid and the heat exchanger at least some of the fin portions are configured and arranged to cause at least a portion of the fluid to swirl around the passageway within which the fin portions are positioned, at least one fin has at least one main directing member, the main directing member having a first side, a second side and is configured and arranged to cause a portion of the fluid to flow unidirectionally from the first side of a main directing member to the second side of the main directing member as the fluid flows through the fin.

24. A heat engine body comprising:
(a) a container defining a sealed region within which a working fluid is circulated when the heat engine is in use, the sealed region having first and second portions, the first portion is at a different temperature than the second portion when the heat engine is in use, the first and second portions being in fluid flow communication via a working fluid passageway;

(b) a heat source positioned to provide heat to one of the first and second portions of the sealed region; and, (c) a heat exchanger having at least one fluid flow passageway, the passageway defined by first and second spaced apart walls and at least one fin extending between the first and second spaced apart walls, the at least one fin mechanically engaging at least the first wall whereby the mechanical engagement of the at least one fin and the first wall at least assists in securing the first wall in position.

25. The heat engine body as claimed in claim 24 wherein the at least one fin mechanically engages the first and second walls whereby the mechanical engagement of the at least one fin and the first and second walls at least assists in securing the first wall in position.

26. The heat engine body as claimed in claim 24 wherein the at least one fin mechanically engages the first and second walls whereby the mechanical engagement of the at least one fin and the first and second walls secures the first wall in position.

27. The heat engine body as claimed in claim 24 wherein the at least one fin comprises a plurality of longitudinally spaced apart fins.

28. The heat engine body as claimed in claim 27 wherein the at least one fin mechanically engages the first and second walls.

29. The heat engine body as claimed in claim 28 wherein the at least one fin is constructed from metal and are prepared by stamping.

30. The heat engine body as claimed in claim 27 wherein the at least one fin has a deformable collar for lockingly engaging the wall to which the fin is attached.

31. The heat engine body as claimed in claim 24 wherein the at least one fin comprises a helical fin.

32. The heat engine body as claimed in claim 31 wherein the at least one fin mechanically engages the first and second walls.

33. The heat engine body as claimed in claim 32 wherein the at least one fin is constructed from metal and are prepared by stamping.

34. The heat engine body as claimed in claim 32 wherein the at least one fin has a deformable collar for lockingly engaging the wall to which the fin is attached.

35. The heat engine body as claimed in claim 24 wherein the at least one fin is constructed from metal and are prepared by stamping.

36. The heat engine body as claimed in claim 24 wherein the at least one fin has a deformable collar for lockingly engaging the wall to which the fin is attached.

* * * * *